US012255877B1

(12) United States Patent
Smolsky et al.

(10) Patent No.: US 12,255,877 B1
(45) Date of Patent: Mar. 18, 2025

(54) CLOUD PACKET TAP

(71) Applicant: Netskope, Inc., Santa Clara, CA (US)

(72) Inventors: Oleg Murat Smolsky, Sunnyvale, CA (US); Vishwanath U. Shenoy, Bengaluru (IN); Krishna Narayanaswamy, Saratoga, CA (US); Piyush Patel, San Jose, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/661,092

(22) Filed: May 10, 2024

(51) Int. Cl.
*H04L 9/40* (2022.01)

(52) U.S. Cl.
CPC ...... *H04L 63/0281* (2013.01); *H04L 63/0428* (2013.01)

(58) Field of Classification Search
CPC .............. H04L 63/0281; H04L 63/0428
USPC .......................................... 726/12
See application file for complete search history.

(56) References Cited

U.S. PATENT DOCUMENTS

| 5,440,723 | A  | 8/1995  | Arnold et al.   |
|-----------|----|---------|-----------------|
| 6,513,122 | B1 | 1/2003  | Magdych et al.  |
| 6,622,248 | B1 | 9/2003  | Hirai           |
| 7,080,408 | B1 | 7/2006  | Pak et al.      |
| 7,298,864 | B2 | 11/2007 | Jones           |
| 7,376,719 | B1 | 5/2008  | Shafer et al.   |
| 7,735,116 | B1 | 6/2010  | Gauvin          |
| 7,966,654 | B2 | 6/2011  | Crawford        |
| 8,000,329 | B2 | 8/2011  | Fendick et al.  |
| 8,296,178 | B2 | 10/2012 | Hudis et al.    |
| 8,745,384 | B2* | 6/2014 | Persaud ................. H04L 9/0822 713/168 |
| 8,793,151 | B2 | 7/2014  | DelZoppo et al. |
| 8,819,285 | B1* | 8/2014 | Wilkinson .......... H04L 63/1441 726/23 |
| 8,839,417 | B1 | 9/2014  | Jordan           |
| 9,197,601 | B2 | 11/2015 | Pasdar           |

(Continued)

FOREIGN PATENT DOCUMENTS

EP         1063833 A2    12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Amare F Tabor

(57) ABSTRACT

A cloud-based network security system that includes a packet tap and exposes a synthetic packet stream representing the bidirectional data between enterprise client devices and cloud hosted services is disclosed. The security system intercepts packets of communication sessions and uploads a copy of the packets to cloud storage. A proxy of the security system derives session keys for the communication session and uploads the session keys to the cloud storage. An enterprise stitcher obtains the packets from the cloud storage, stitches the packets together in sequential order, and modifies the Layer 3 and Layer 4 headers to generate synthetic packet streams representing the communication sessions. The stitcher may decrypt the packets or provide the session key with the synthetic packet stream. The stitcher provides the synthetic packet streams to enterprise packet analysis systems for storage, auditing, analysis, and the like.

20 Claims, 11 Drawing Sheets

(56) References Cited

U.S. PATENT DOCUMENTS

| | | | |
|---|---|---|---|
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 10,084,825 | B1 | 9/2018 | Xu |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,826,941 | B2 | 11/2020 | Jain et al. |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 11,297,106 | B2 * | 4/2022 | Masciarelli ......... H04L 63/1416 |
| 11,750,405 | B2 * | 9/2023 | Devarajan ........... H04L 63/1416 713/175 |
| 11,770,380 | B1 * | 9/2023 | Goeringer ........... H04L 63/1416 726/22 |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2006/0262808 | A1 * | 11/2006 | Lin ....................... H04L 69/166 370/466 |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2014/0366155 | A1 * | 12/2014 | Chang .................. G06F 9/45558 726/27 |
| 2015/0100357 | A1 | 4/2015 | Seese et al. |
| 2015/0363611 | A1 * | 12/2015 | Redberg .................. H04L 63/06 713/165 |
| 2015/0379292 | A1 * | 12/2015 | Lewis ................. G06F 21/6218 713/165 |
| 2016/0065364 | A1 * | 3/2016 | Amiri ................... H04L 9/0897 380/278 |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2020/0050686 | A1 | 2/2020 | Kamalapuram et al. |
| 2023/0239270 | A1 * | 7/2023 | Nahas ................. H04L 63/1425 726/1 |

OTHER PUBLICATIONS

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

NIIT, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet, FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

(56) References Cited

OTHER PUBLICATIONS

Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management for Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

CLOUD PACKET TAP

BACKGROUND

Many enterprises (e.g., corporations, companies, businesses, governments, non-profits, individual users, and the like) use cybersecurity systems (e.g., data loss prevention, intrusion detection, virus protection, and the like) to ensure their employees and other users do not intentionally or inadvertently pose cybersecurity risks. Cloud-based security service providers often perform the security services needed. Prior to the advent of cloud-based services, on-premises devices were often used that analyzed packets for security issues. These on-premises devices often had a packet tap option for administrators to obtain a copy of the packets. A packet Terminal Access Point (i.e., packet tap) provides access to the packet stream. Packet taps can be used to obtain a copy of the packet streams for analyzing packets for security issues (e.g., intrusion detection and the like) as well as storage for regulatory purposes, auditing, and so forth. Using cloud-based security service providers, enterprises steer traffic from relevant devices to the cloud-based service providers so that the security services may be rendered. The security services may include, for example, threat protection, data loss prevention, and the like. The methods to steer traffic may be implemented using various steering methods (e.g., Internet Protocol Security (IPSec), virtual private networks (VPNs), proprietary tunnels, and the like) and various deployment methods such as routing client software on devices, gateways at enterprise offices, and the like.

Once traffic is directed (i.e., steered) to the cloud-based security provider, the enterprise (i.e., customer) loses the ability to inspect, store, or audit traffic. Simply exposing the traffic flow to the enterprise at the client device or from the cloud-based security provider does not create the desired visibility. Session encryption and/or tunnelling that protects the traffic flowing between the users' devices and the cloud-based security provider system as well as the redirection to the cloud-based security provider make the raw traffic flow meaningless to the enterprise. Further, the enterprise cannot capture the traffic from the client devices reliably due to mobility and off-site access. Further still, the enterprise could not decrypt the traffic even if it could be captured. However, many customers desire to, and in some types of enterprises (e.g., banking) are required to, inspect, store, or audit traffic from enterprise users. Accordingly, improvements are needed that allow a customer to steer traffic to cloud-based security service providers and still retain or regain visibility into the steered traffic.

SUMMARY

Methods, systems, and computer-readable memory devices storing instructions are described that provide a packet tap for enterprises to obtain visibility into packets steered to cloud-based security service providers. The packets received at the network security system hosted by the cloud-based security service provider are not in a format that provides the insights needed for packet analysis by the enterprise because the packets have been steered to the network security system. Further, the associated session, including each packet, may be encrypted, so without the associated session key, the enterprise cannot decrypt and analyze the packets. Accordingly, a synthetic packet stream is generated from the tapped packets to provide the relevant data for packet analysis, storage, inspection, and auditing by the enterprise. The synthetic packet stream may be generated using decrypted packets or the associated session key may be provided with the synthetic packet stream, when needed.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The method includes intercepting, at a gateway of a network security system interposed on a network between a client device associated with a first internet network address and a cloud hosted service associated with a second network address, packets of a communication session on the network between the client device and the cloud hosted service. The method further includes transmitting, by an uploader of the network security system, the packets to a cloud storage location. The method further includes extracting, by a proxy of the network security system, a session key associated with the communication session from the packets and transmitting the session key to the cloud storage location. The method further includes obtaining, by a stitcher, the packets and the session key from the cloud storage location and stitching the packets together into a synthetic packet stream of bidirectional data representing at least a portion of the communication session. Stitching the packets together includes ordering the packets into a sequential order and modifying a destination address in each packet to one of the first network address and the second network address based on an intended destination of the respective packet. Other embodiments of this aspect include corresponding computer systems, apparatus, and computer programs recorded on one or more computer storage devices, each configured to perform the actions of the methods.

Implementations may include one or more of the following features. Optionally, the proxy may encrypt the session key before transmitting it to the cloud storage location. In such embodiments, the stitcher may have a corresponding key to decrypt the session key or may be integrated with a third-party key management service for accessing the corresponding key to decrypt the session key.

Optionally, the stitcher may correlate the packets of the communication session with the session key and decrypt the packets using the session key to produce plain-text payloads of the packets. In some embodiments, the stitcher may use the plain-text payloads to generate the synthetic packet stream.

Optionally, the gateway is one gateway of a number of gateways hosted in datacenters in distinct geographic locations. Further, the uploader may be one uploader of a number of uploaders hosted in datacenters in distinct geographic locations. The uploaders may be co-located (i.e., hosted in the same datacenter) or geo-optimized (i.e., hosted in a datacenter in the same geographic location or the closest geographic location) with the gateways. In other words, the system may be configured so that the gateway and uploader are geo-optimized ensuring that a gateway provides the packets to an uploader that is hosted in a datacenter that is geographically closest to the datacenter hosting the gateway. Similarly, there may be multiple uploaders, multiple cloud storage locations, and/or multiple stitchers, each hosted in datacenters that are in distinct geographic locations. In such embodiments, each component may be geo-optimized with the others such that the uploaders upload batches to cloud storage locations that are geo-optimized with the uploader, and the stitchers access data from the cloud storage locations that are geo-optimized with the stitcher.

Optionally, the stitcher may export the synthetic packet stream to a packet capture format. Optionally, the stitcher may transmit the synthetic packet stream to an intrusion detection system for the enterprise. Optionally, the stitcher may transmit the session key to the intrusion detection system with the synthetic packet stream.

Optionally, the method further includes receiving, by the stitcher, a request for a communication session associated with one or more parameters. The stitcher may access a time-based slice of data corresponding to the request from the cloud storage location. The stitcher may filter the packets in the time-based slice based on the parameters and generate the synthetic packet stream using the filtered packets.

Optionally, the uploader may batch the packets as they are intercepted by the gateway and transmit the packets to the cloud storage location in batches.

Optionally, the stitcher may periodically poll the cloud storage location for new packets and upon obtaining new packets, and continuously generate synthetic packet streams for each associated communication session based on the new packets. Implementations of the described techniques may include hardware, a method or process, or computer software on a computer-accessible medium.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
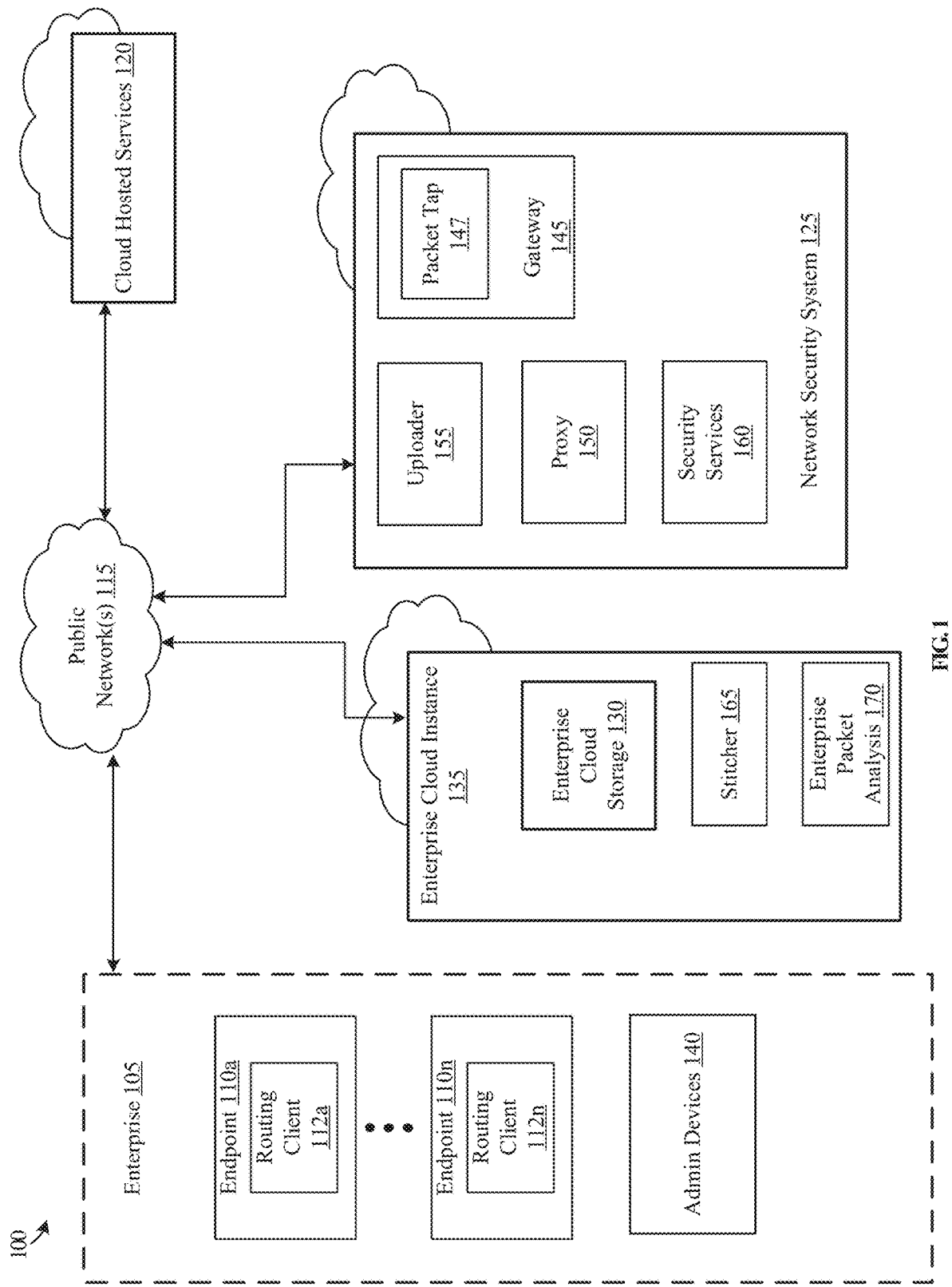
FIG. 1 illustrates a system including a cloud-based security system that includes a packet tap, according to some embodiments.

To properly protect devices, accounts, and data from nefarious and inadvertent security risks, all online users need cybersecurity systems. While some online users, including enterprises, may be able to develop and implement their own security systems, many choose to leave security to professional companies that provide online security services. These security services are often implemented in a cloud-based environment, such that the cloud-based security service providers intercept traffic from their customers' devices and perform security analysis for the customer to protect the customer from security risks including both intentional and inadvertent security risks.

To utilize these cloud-based security services, traffic from user devices of the enterprise is steered to the cloud-based security service provider's data centers for security analysis. Once the traffic is steered to the data center, the customer (e.g., individual user, enterprise, and the like) loses visibility into the packets (i.e., traffic) that were steered to the security service provider data centers.

However, some enterprises desire or even need (e.g., for compliance purposes) visibility into the traffic flowing between enterprise client devices and outside devices, systems, and services. For example, banking enterprises may need to retain traffic information for auditing purposes.

To address this need, the present disclosure describes systems and methods for accessing the traffic flow at the network security system gateway with a packet Terminal Access Point (packet tap). The network security system gateway is the only viable access point for the packet tap because it is the most reliable point through which all enterprise traffic flows. Given the advancements in technologies including bring your own device, network access anywhere (e.g., at cafés and other public locations), working from home, and other factors, the network security system gateway provides the best point for the packet tap. However, steering the traffic to the network security system introduces artifacts into the traffic that limit the visibility of the destinations and value of the raw packet stream. For example, the destination address of the traffic may appear to be the network security system, when the true destination may be a cloud hosted service or application. Accordingly, the disclosure describes details of using the bidirectional traffic tap to store the traffic and session keys and use that information to generate a synthetic packet stream that represents the bidirectional traffic of a communication session between the enterprise device and the true destination (e.g., cloud hosted service or application). The synthetic packet stream is generated in a way that removes the network security system interception and activity to appear as a bidirectional traffic stream directly between the enterprise device (also referred to herein as client device or customer device) and the third-party destination (e.g., cloud hosted service or application).

More specifically, the network security system intercepts the traffic (i.e., packets) at the gateway. A packet tap on the gateway redirects a copy of the packets to an uploader. The uploader batches the packets and uploads the packets in batches to an enterprise cloud storage location. Note that each instance of the network security system may be implemented for a specific customer (i.e., enterprise). In some embodiments, where multiple enterprises access the same gateway, the packet tap separates all packets by enterprise such that packets for differing enterprises are separated and not stored together. The gateway passes the packets as usual to the proxy for security analysis. The proxy derives the session key for each encrypted communication session (e.g., TCP connection) associated with the packets and uploads the session keys to the enterprise cloud storage location. At the network security system, security analysis proceeds as normal. In other words, the packet tap, packet upload, and session key upload do not interfere with normal security analysis performed by the online network security system.

Once the session keys and packets for a given enterprise are stored in the enterprise cloud storage location, a stitcher implemented for the enterprise is used to access the enterprise cloud storage location and stitch the packets together into a synthetic packet stream. The stitcher may be implemented, for example, in a virtual private cloud for the enterprise. The packets and session keys may be uploaded and stored in the enterprise cloud storage location as binary large objects (BLOBs).

The stitcher may access the data in the enterprise cloud storage location, for example, by accessing or requesting time-based slices of data or periodically accessing or requesting newly uploaded BLOBs. The stitcher may extract the packets and session keys and correlate the session keys to the corresponding packets. In some embodiments, the stitcher may filter the packets to access only requested packets. In some embodiments, the stitcher may include all packets in the packet stream.

Once the packets to include are extracted and session keys are correlated, the stitcher may decrypt the packets and include the plain text payloads in the synthetic packet stream. In some embodiments, the stitcher does not decrypt the packets and uses the encrypted payloads in the synthetic packet stream. The stitcher further modifies the L3 and L4 headers. For example, the destination addresses may be modified from indicating the network security system to indicate the true destination address (e.g., the enterprise device or the hosted service address, depending on whether the packet is travelling from the enterprise device or to the enterprise device in response to a request from the enterprise device). Additionally, the ports for the destination may be modified to indicate the correct port for the true destination. Further, the packets may be ordered into a sequential order. Once the synthetic packet stream is generated, it may be provided to a requesting system or device. For example, a continuous synthetic packet stream may be provided to an intrusion detection system. As another example, an administrator may request a specific traffic slice, and the corresponding synthetic packet stream may be transmitted to the administrator at, for example, an administrator device. In some embodiments, the session key may be transmitted with the synthetic packet stream.

Advantageously, the disclosed packet tap and corresponding synthetic packet streams may provide a near real-time view of enterprise traffic at an enterprise system while still allowing the enterprise to use the cloud-based network security system for cybersecurity purposes. Further, the packet tap may provide additional information beyond what a packet tap in prior systems could provide because enterprise users that operate remotely can be included in the packet tap. This type of packet tap allows enterprises and customers generally to utilize the services of a cloud-based network security system while still meeting regulatory and other requirements for access, analysis, and auditing of enterprise traffic. Such systems provide previously unavailable information. Additional features include geo-optimized systems to avoid excessive traffic flow across large geographic areas. Such features reduce computational and memory resources needed for handling large bandwidth over great distances.

Turning now to FIG. 1, system 100 illustrates components for providing cloud-based network security services including a packet tap and corresponding synthetic packet stream generation for an enterprise. System 100 includes enterprise 105, public network 115, cloud hosted services 120, network security system 125, and enterprise cloud instance 135.

Enterprise 105 represents the enterprise for which cloud-based network security services are provided. Enterprise 105 is depicted with a dotted line to indicate that the boundary is not geographic but rather virtual and may include endpoints 110 and administrator devices 140 that span the globe and may access public network 115 through many types of mechanisms. For example, endpoints 105 may access public network 115 from office locations, home locations, public locations (e.g., cafes, airports, or anywhere that offers network access), and the like. Many enterprises may be supported by the cloud-based network security system 125, but only a single enterprise 105 is shown for ease of description. Further, for each enterprise 105 supported, a different instance of network security system 125 may be implemented in a virtual manner, ensuring that data specific to each enterprise 105 is isolated. Enterprise 105 includes endpoints 110 and administrator device 140 as shown but may include many other devices and components not included for ease of description.

Figure 8:
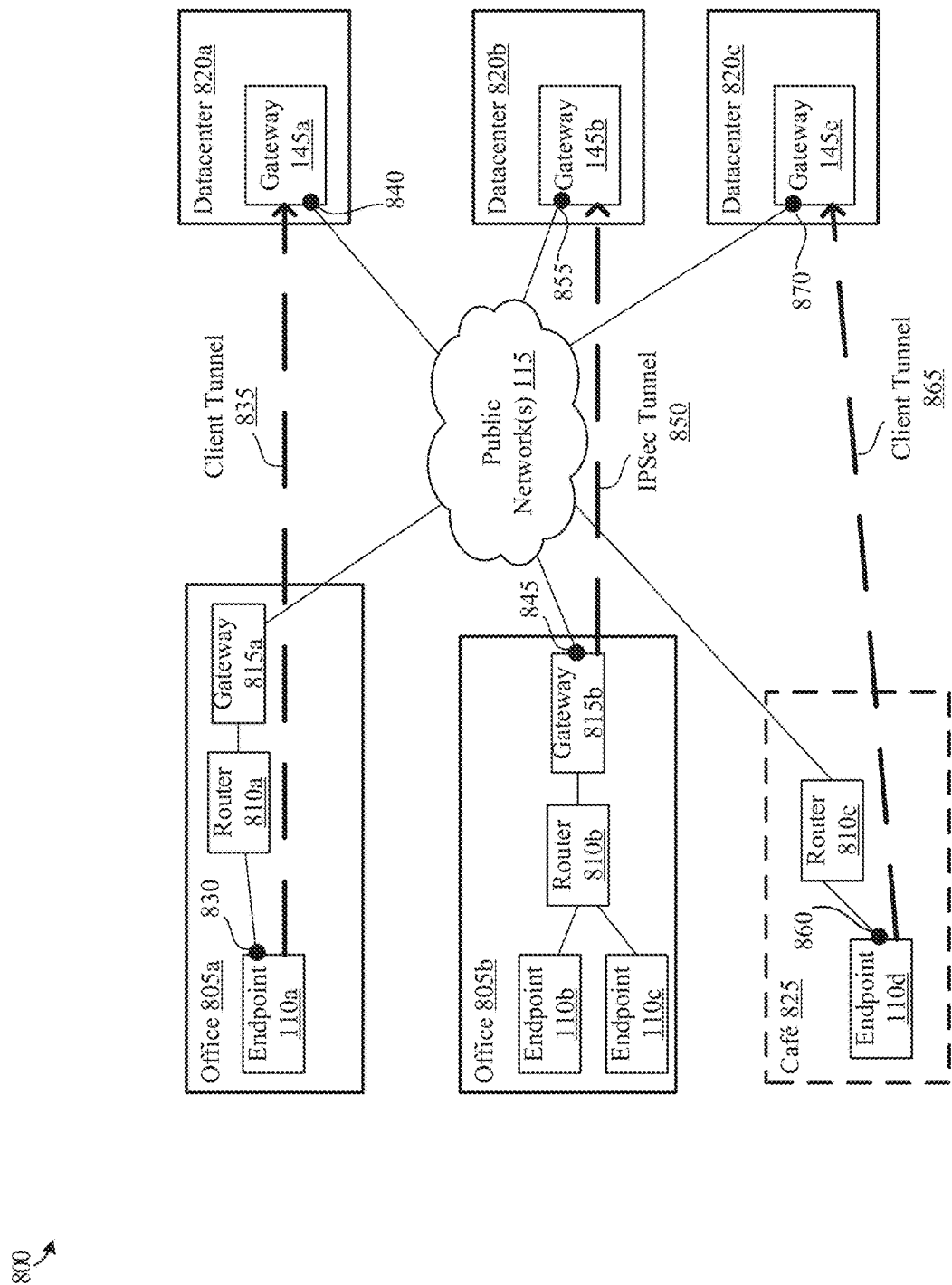
FIG. 8 illustrates the point of view of the synthetic packet streams and associated packet tap locations, according to some embodiments.

Endpoints 110 include endpoint 110*a* through endpoint 110*n* indicating any number of endpoints 110 may be included in enterprise 105. Endpoints 110 may include user devices including desktops, laptops, mobile devices, and the like. The mobile devices include smartphones, smart watches, and the like. Endpoints 110 may also include internet of things (IoT) devices. Endpoints 110 may include any number of components including those described with respect to computing device 1100 of FIG. 11 including processors, output devices, communication interfaces, input devices, memory, and the like, all not depicted here for clarity. Endpoints 110 may be used to access content (e.g., documents, images, and the like) stored in cloud hosted services 120 and otherwise interact with cloud hosted services 120. Endpoints 110 may be a routing or gateway device serving a number of other client devices at, for example, an office location. For example, gateway 815*b* depicted in FIG. 8 illustrates a gateway that serves a number of client devices (endpoints 110*b* and 110*c*) to route traffic through public network 115 to gateway 145*b*. In such embodiments, gateway 815*b* may be considered an endpoint 110. Endpoints 110 may include endpoint routing client 112. In some embodiments, endpoint routing client 112 may be a client installed on endpoint 110. In other embodiments, endpoint routing client 112 may be implemented using a gateway (e.g., gateway 815*b*) that traffic from some endpoints 110 passes through for transmission out of a private or sub-network.

Endpoint routing client 112 routes network traffic transmitted from its respective endpoint 110 to the network security system 125. Depending on the type of device for which endpoint routing client 112 is routing traffic, endpoint routing client 112 may use or be a virtual private network (VPN) such as VPN on demand or per-app-VPN that use certificate-based authentication. For example, for some devices having a first operating system, endpoint routing client 112 me be a per-app-VPN may be used or a set of domain-based VPN profiles may be used. For other devices having a second operating system, endpoint routing client 112 may be a cloud director mobile app. Endpoint routing client 112 can also be an agent that is downloaded using e-mail or silently installed using mass deployment tools. As noted above, endpoint routing client 112 may be installed on a gateway or routing device that routes all traffic out of a subnetwork (e.g., an office location subnetwork) to network security system 125. Endpoint routing client 112*a* through endpoint routing client 112n are depicted to indicate any number of endpoint routing clients 112 may be included in enterprise 105.

Administrator device 140 may be any administrative device used by enterprise 105. For example, information technology (IT) professionals employed or contracted by enterprise 105 may have devices with additional functionality that allow for access to network security system 125 interfaces for setting parameters, security rules and requirements, and the like. Further, administrator device 140 may include an interface to stitcher 165 for requesting packet information obtained via packet tap 147. Administrator device 140 may also include endpoint routing client 112, in some embodiments.

Public network 115 may be any public network including, for example, the Internet. Public network 115 couples endpoints 110, administrator device 140, network security system 125, cloud hosted services 120, and enterprise cloud instance 135 such that any may communicate with any other via public network 115. The actual communication path can be point-to-point over public network 115 and may include communication over private networks (not shown). In some embodiments, endpoint routing client 112, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Cloud hosted services 120 can be cloud computing and storage services, financial services, e-commerce services, or any type of applications, websites, or platforms that provide cloud-based storage or web services. Cloud hosted services 120 can be referred to as cloud services, cloud applications, cloud storage applications, cloud computing applications, or the like. Cloud hosted services 120 provide functionality to users that can be implemented in the cloud and that can be the target of data loss prevention (DLP) policies, for example, logging in, editing documents, downloading data, reading customer contact information, entering payables, deleting documents, and the like. Cloud hosted services 120 can be a network service or application, or can be web-based (e.g., accessed via a URL) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. While only one Cloud hosted services 120 is depicted in FIG. 1, any number of hosted services may be available and included in system 100. Hosted services may be sanctioned (e.g., those that a company provides for employee use and of which the company's information technology (IT) department is aware) or unsanctioned (e.g., those a company is not aware of or otherwise are not authorized for use by the company).

Network security system 125 may provide network security services to endpoints 110 and administrator device 140. Endpoint routing client 112 may route traffic from the endpoints 110 to network security system 125 to perform security analysis and enforce security policies including, for example, threat protection, data loss prevention (DLP), and the like. Network security system 125 may be one or more computing systems such as computing device 1100 as described with respect to FIG. 11. Network security system 125 includes gateway 145, uploader 155, proxy 150, and security services 160. The modules of network security system 125 may be implemented in hardware, software, firmware, or a combination and need not be divided up in precisely the same modules as shown in FIG. 1. Some of the modules can also be implemented on different processors or computers or spread among any number of different processors or computers. In addition, in some embodiments, modules may be combined, operated in parallel, or in a different sequence than that shown without affecting the functions achieved and without departing from the spirit of this disclosure. Also, as used herein, the term "module" can include "sub-modules," which themselves can be considered to constitute modules. The term module may be interchanged with component and neither term requires a specific hardware element but rather indicates a device or software that is used to provide the described functionality. The modules (shown as blocks) in network security system 125 may, in some embodiments, also be thought of as flowchart steps in a method. In some embodiments, a software module need not have all its code disposed contiguously in memory (e.g., some parts of the code can be separated from other parts of the code with code from other modules or other functions disposed in between). Network security system 125 may be cloud-based, and an instance of network security system 125 may be generated for each enterprise 105 using network security system 125 security services. In some embodiments, network security system 125 may provide services for any number of enterprises 105, and techniques may be used to distinguish the traffic from differing enterprises 105.

Gateway 145 intercepts the packets (i.e., traffic) directed to network security system 125. Traffic from endpoints 110 may be routed to gateway 145, and based on security analysis of security services 160, the traffic may be blocked or transmitted to the intended destination (e.g., cloud hosted services 120). Responses from the destination (e.g., cloud hosted services 120) are returned to proxy 150 and gateway 145 of network security system 125, and security services 160 analyze the responses to determine whether to block the response or transmit the response to the intended destination (e.g., endpoint 110). In this way, gateway 145 receives all bidirectional traffic between endpoints 110 and third parties including cloud hosted services 120. Gateway 145 and proxy 150 ensure the packets undergo security analysis by security services 160 of network security system 125 by capturing the packets, decrypting the packets, and submitting them for the relevant security analysis of security services 160. Further proxy 150 and gateway 145 ensure only packets passing security analysis by security services 160 are transmitted to their intended destination (e.g., endpoints 110 or cloud hosted services 120). Gateway 145 includes packet tap 147. Gateway 145 may be implemented in hardware, software, firmware, or a combination. Gateway 145 may be a gateway implemented for enterprise 105, and a different gateway 145 may be implemented for each different enterprise 105.

Packet tap 147 transmits a copy of each packet flowing through gateway 145 to uploader 155. Packet tap 147 "tees" the packets off without impacting the typical flow of the packets through gateway 145 to proxy 150. Packet tap 147 tees off a copy of the packets in a stable, scalable manner. Packet tap 147 may be implemented in software, firmware, hardware, or a combination. Packet tap 147 does not modify the packets and only sends a copy to uploader 155. In some embodiments in which gateway 145 is used by multiple enterprises 105, packet tap 147 may determine which enterprise 105 the packets pertain to and direct the packets to the relevant uploader 155. In other embodiments, packet tap 147 does not analyze the packets and only serves to provide a copy to uploader 155.

Uploader 155 may batch the packets from packet tap 147. Uploader 155 may generate batches of the packets and upload the batches to enterprise cloud storage 130. In some embodiments, the packets are stored in a packet capture format (e.g., .pcap) and batches are uploaded as BLOBs to enterprise cloud storage 130. The batches may be time-based or size-based, in some embodiments. For example, uploader 155 may upload all batched packets periodically (e.g., every 10 seconds, every 60 seconds, every 5 minutes, and the like). As another example, uploader 155 may upload all batched packets when the size of the batch reaches a certain size (e.g., 100 bytes, 10 kilobytes, 100 megabytes, 1 gigabyte, or the like). When uploaded as BLOBs, the naming format of each BLOB may provide relevant data for retrieval. For example, the naming structure may include an indicator that the BLOB contains packets, a timestamp, a site identifier for the data center in which the gateway resides, a gateway identifier for the particular gateway 145, a chunk identifier that increments for each uploaded batch (i.e., each BLOB) associated with the particular gateway 145, or any combination thereof. In some embodiments, the packets are uploaded immediately upon receipt in packet capture format and stored in enterprise cloud storage 130 as packets rather than as BLOBs. Uploader 155 may be implemented in hardware, software, firmware, or a combination.

Proxy 150 receives a copy of the packets from gateway 145. Proxy 150 may be a termination point for packets of a communication session so that proxy 150 may access or extract the session key for the communication session based on the session handshake (e.g., Transport Layer Security (TLS) handshake). In other words, for example, the packets may be encrypted with TLS encryption, and proxy 150 extracts the session key associated with the communication session for decrypting the packets in the communication session. Proxy 150 may extract or identify the session key for the packet and transmit the session key to enterprise cloud storage 130. In some embodiments, proxy 150 may encrypt the session key before transmission to enterprise cloud storage 130. In some embodiments, proxy 150 may provide a decryption key to stitcher 165 using cryptographic technologies known in the art. In some embodiments, proxy 150 may integrate with a third-party key management system for managing the encryption and decryption keys, and proxy 150 may obtain an encryption key for encrypting the session keys from the key management system. The session key may be immediately uploaded as a session key, in some embodiments. In some embodiments, proxy 150 may batch session keys, either encrypted or unencrypted, and upload batches of session keys as BLOBs to enterprise cloud storage 130. The naming convention for the session key BLOBs may provide relevant data for retrieval. For example, the naming structure may include an indicator that the BLOB contains session keys, a timestamp, a site identifier for the data center in which the proxy resides, a proxy identifier for the particular proxy 150, a chunk identifier that increments for each uploaded batch (i.e., each BLOB) associated with the particular proxy 150, or any combination thereof. The batches may be time-based or size-based, in some embodiments. For example, proxy 150 may upload all batched session keys periodically (e.g., every 10 seconds, every 60 seconds, every 5 minutes, and the like). As another example, proxy 150 may upload all batched session keys when the size of the batch reaches a certain size (e.g., 500 bytes, 5 kilobytes, 10 megabytes, or the like). Proxy 150 may also be responsible for decrypting the packets and transmitting the decrypted packets to security services 160 for security analysis. Proxy 150 may be implemented in hardware, software, firmware, or a combination.

Security services 160 include all security analysis and services provided by network security system 125. For example, security services 160 may include threat protection, data loss prevention, and the like. Security services 160 receives the packets from proxy 150 and performs the security analysis. Security services 160 may be any security analysis and services offered by a cloud-based network security service provider. Security services 160 may include any security analysis and may include additional determinations and output beyond whether to block or allow transmission of a packet to its intended destination. For example, security services 160 may track user behavior and generate user confidence scores, generate scores for cloud hosted services 120, provide alerts to users and administrators, coach users, and perform other outputs, which may all be configurable based on security policies selected by enterprise 105. Security services 160 are not impacted by packet tap 147, uploader 155, or extraction of the session key by proxy 150. Security services 160 still perform the same security services as would be provided without access to the packet tap disclosed herein.

Enterprise cloud storage 130 stores the uploaded packets sent by uploader 155 and the session keys sent by proxy 150. Enterprise cloud storage 130 may store the data in any format (e.g., packet capture format such as .pcap) specified by the respective uploading component. Uploader 155 and proxy 150 may upload batches of packets and session keys, respectively, as BLOBs. Each enterprise 105 has an enterprise cloud storage 130 such that data from a given enterprise 105 is stored in an enterprise specific location. In some embodiments, enterprise cloud storage 130 may be a server that stores the uploaded session keys and packets and is hosted locally by enterprise 105 rather than hosted as cloud-based storage.

Enterprise cloud instance 135 hosts services for enterprise 105. In some embodiments, enterprise cloud instance 135 may be a server that hosts the services locally by enterprise 105 rather than being cloud-based. Enterprise cloud instance 135 includes stitcher 165 and enterprise packet analysis 170. Each enterprise 105 has a specific enterprise cloud instance 135 so that each enterprise 105 has an enterprise specific stitcher 165 and its own specific enterprise packet analysis 170.

Enterprise packet analysis 170 includes systems that enterprise 105 uses to analyze and audit traffic associated with endpoints 110. For example, enterprise packet analysis 170 may include intrusion detection systems, auditing systems (e.g., forensic investigation), systems that allow ad-hoc analysis such as a user (i.e., administrator) having the ability to request specific traffic or review flagged traffic, traffic capture or storage (e.g., for regulatory compliance), and the like. Enterprise packet analysis 170 may receive synthetic packet streams from stitcher 165. Enterprise packet analysis 170 may receive near real-time synthetic packet streams from stitcher 165 for continuous analysis. Enterprise packet analysis 170 may be implemented in hardware, software, firmware, or a combination.

Stitcher 165 obtains the packets from enterprise cloud storage 130 and stitches them together to generate the synthetic packet streams representing the bidirectional traffic between endpoints 110 and cloud hosted services 120. Stitcher 165 may be enterprise specific, so that each enterprise 105 has a stitcher 165 used to stitch packets associated with endpoints 110 in the specific enterprise. Stitcher 165 may be implemented in software, hardware, firmware, or a combination. Stitcher 165 may be a containerized tool implemented in enterprise cloud instance 135. Stitcher 165 may request time-based slices of data from enterprise cloud storage 130 or may periodically obtain all new uploads to enterprise cloud storage 130. Stitcher 165 may extract the packets from the requested data, correlate the relevant session keys to the packets, and generate the synthetic packet streams. Generating the synthetic packet streams may include decrypting the packets to include the plain-text payloads in the synthetic packet streams. In some embodiments, stitcher 165 may decrypt the session keys if proxy 150 encrypted the session keys before uploading them to enterprise cloud storage 130. To decrypt the session keys, stitcher 165 may obtain the decryption key from proxy 150 using known cryptographic technologies. In some embodiments, stitcher 165 may be integrated with a third-party key management system to access the appropriate decryption key for decrypting the session keys. Stitcher 165 may modify the level 3 (L3) and level 4 (L4) headers in the packets to generate the synthetic packet streams, and stitcher 165 may order the packets sequentially. For example, endpoint 110a may want to communicate with cloud hosted service 120, and to begin the communication, endpoint 110a sends a request. To transmit the request, endpoint 110a generates a packet, which includes a payload and headers for the network connection and communication session. The network connection (e.g., Transport Control Protocol/Internet Protocol (TCP/IP) connection) is the connection between endpoint 110a and cloud hosted service 120 and is created by communicating a source and destination address (e.g., IP address) associated with each. The communication session is the particular session (e.g., TLS session) for the communication, which may include multiple bi-directional messages including the request, a response from cloud hosted service 120, and perhaps additional back-and-forth messages. Endpoint routing client 112a may ensure the destination address in the packet header is the address of gateway 145 of network security system 125 to route the packet to network security system 125, and endpoint routing client 112a may further provide additional information to ensure network security system 125 knows the true destination is cloud hosted service 120. After network security system 125 performs security analysis (e.g., with security services 160), network security system 125 transmits the request to cloud hosted service 120. Network security system 125 may receive a response from hosted service 120 at gateway 145. This bi-directional communication includes one or more packets in each direction and is at least a portion of a communication session (e.g., TLS session) between endpoint 110a and cloud hosted service 120 over a network connection. In these packets, the destination network address and destination ports in the packets will be the address and port for gateway 145 of network security system 125, but the true source and destination addresses and ports for the bidirectional communication in a communication session (e.g., TLS session) is either the address and port for endpoint 110a or the address and port for cloud hosted service 120, depending on which sent the communication (i.e., packets). To generate the synthetic packet stream, stitcher 165 may modify the destination address in the level 3 (i.e., L3, or network layer) headers and the destination port in the level 4 (i.e., L4, or transport layer) headers. Further each packet may include a sequence number of the communication session in the L4 headers, and stitcher 165 may use the sequence number to put the packets into sequential order. Stitcher 165 may export the synthetic packet stream into any appropriate format for the requestor and transmit the synthetic packet stream to the requestor (e.g., enterprise packet analysis 170 or administrator device 140). Further details describing the functionality of stitcher 165 are included in FIG. 3.

Figure 2:
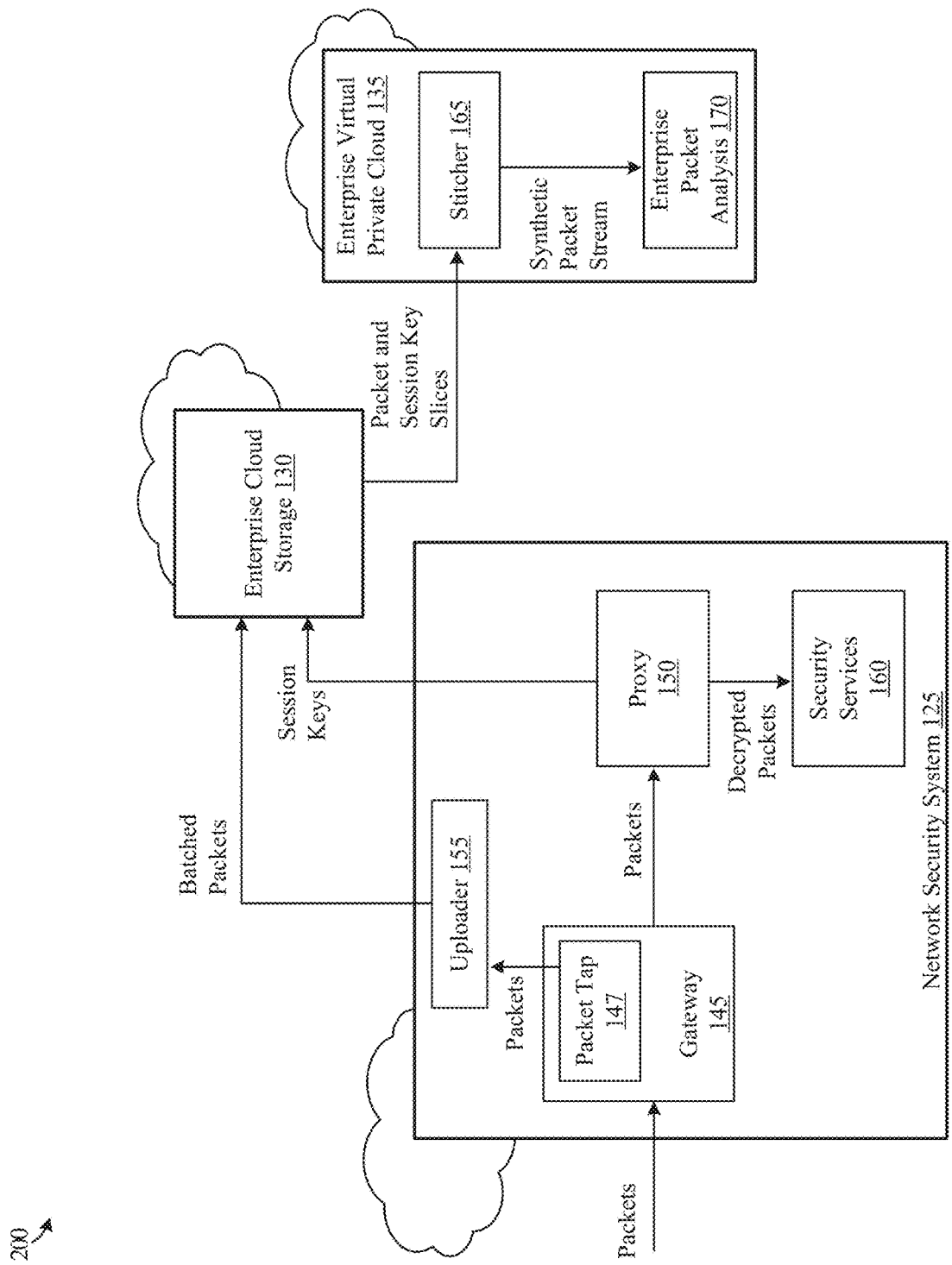
FIG. 2 illustrates additional details including data flow and the packet tap using the cloud-based security system of FIG. 1, according to some embodiments.

FIG. 2 illustrates a flow 200 of packets through components of system 100 of FIG. 1. Packets flow from endpoints 110 and cloud hosted services 120 into gateway 145 of network security system 125. As described above, endpoint routing client 112 may steer the traffic (i.e., packets) to gateway 145 from endpoints 110 based on initial requests to cloud hosted services 120. Once the initial request is steered to network security system 125, responses and other messages of the communication session are also steered to gateway 145 of network security system 125.

Packet tap 147 transmits a copy of the packets to uploader 155. Packet tap 147 does not modify the packets flowing through gateway 145. Gateway 145 passes the packets to proxy 150. Proxy 150 extracts the session key for the communication session from the packets. In some embodiments, proxy 150 decrypts the packets and sends the decrypted packets to security services 160 for security analysis. In some embodiments, proxy 150 may not decrypt the packets before sending the packets to security services 160 for security analysis.

Proxy 150 may batch the session keys and transmit a batch of session keys as a BLOB to enterprise cloud storage 130. Proxy 150 may be configured to transmit all batched session keys periodically (i.e., time-based batches) or once a certain number or size of session keys are batched (i.e., size-based batches). In some embodiments, proxy 150 may encrypt the session keys before transmitting the session keys to enterprise cloud storage. If encrypted, stitcher 165 maintains the decryption key or a third-party key management system may be used for managing the encryption and decryption keys. Accordingly, the session keys may be encrypted while stored in enterprise cloud storage 130. Proxy 150 may further extract user information associated with the packets (e.g., user information for the user associated with or logged into endpoint 110). In some embodiments, the user information may be included with the session keys and uploaded with the session keys to enterprise cloud storage.

Uploader 155 batches the packets transmitted from packet tap 147. The packets may be tapped and batched in a proprietary format, a packet capture format, or any other format. One example format is packet capture (.pcap) format. Binary Large Object (BLOB) is a storage type in which data need not be structured, and the data is stored as BLOBs or objects and can be in any file format. The batched packets may be transferred as a BLOB to enterprise cloud storage 130. Uploader 155 may batch the packets and transmit a batch of packets periodically (e.g., time-based batches) or once a certain number or size of packets are batched (e.g., size-based batches).

Enterprise cloud storage 130 may be BLOB storage and store the session keys and packets for any length of time. Administrators of enterprise 105 may determine whether and when data stored in enterprise cloud storage 130 may be deleted or removed.

Stitcher 165 in enterprise cloud instance 135 may obtain the packets and session keys from enterprise cloud storage 130. In some embodiments, stitcher 165 may request specific time-based slices of stored data. In some embodiments, stitcher 165 may poll enterprise cloud storage 130 for new data that has been uploaded. In some embodiments, stitcher 165 may both poll and make specific requests. Stitcher 165 may perform such polling or requests based on requests made to stitcher 165, which is described in more detail with respect to FIG. 3.

Stitcher 165 receives the packets and session keys from enterprise cloud storage 130 and stitches the packets together into synthetic packet streams. Stitcher 165 extracts the relevant packets needed and correlates the relevant session keys to the associated packets. Stitcher 165 may decrypt the packets using the session keys, in some embodiments. In some embodiments, before using the session keys, stitcher 165 may need to decrypt the session keys if proxy 150 encrypted the session keys. Stitcher 165 stitches together a synthetic packet stream by modifying the destination addresses and destination ports in the layer 3 and layer 4 headers and, in some embodiments, ordering the packets into a sequential order. Additional details of stitcher 165 and its functions are described in more detail with respect to FIG. 3.

Stitcher 165 may encapsulate the synthetic packet stream into a particular format requested by the requestor, in some embodiments. Stitcher 165 then sends the synthetic packet stream to the requestor, shown in FIG. 2 as enterprise packet analysis 170. Enterprise packet analysis 170 may include any requestor such as intrusion detection systems, auditing systems, administrators (e.g., administrator device 140), and the like.

Figure 3:
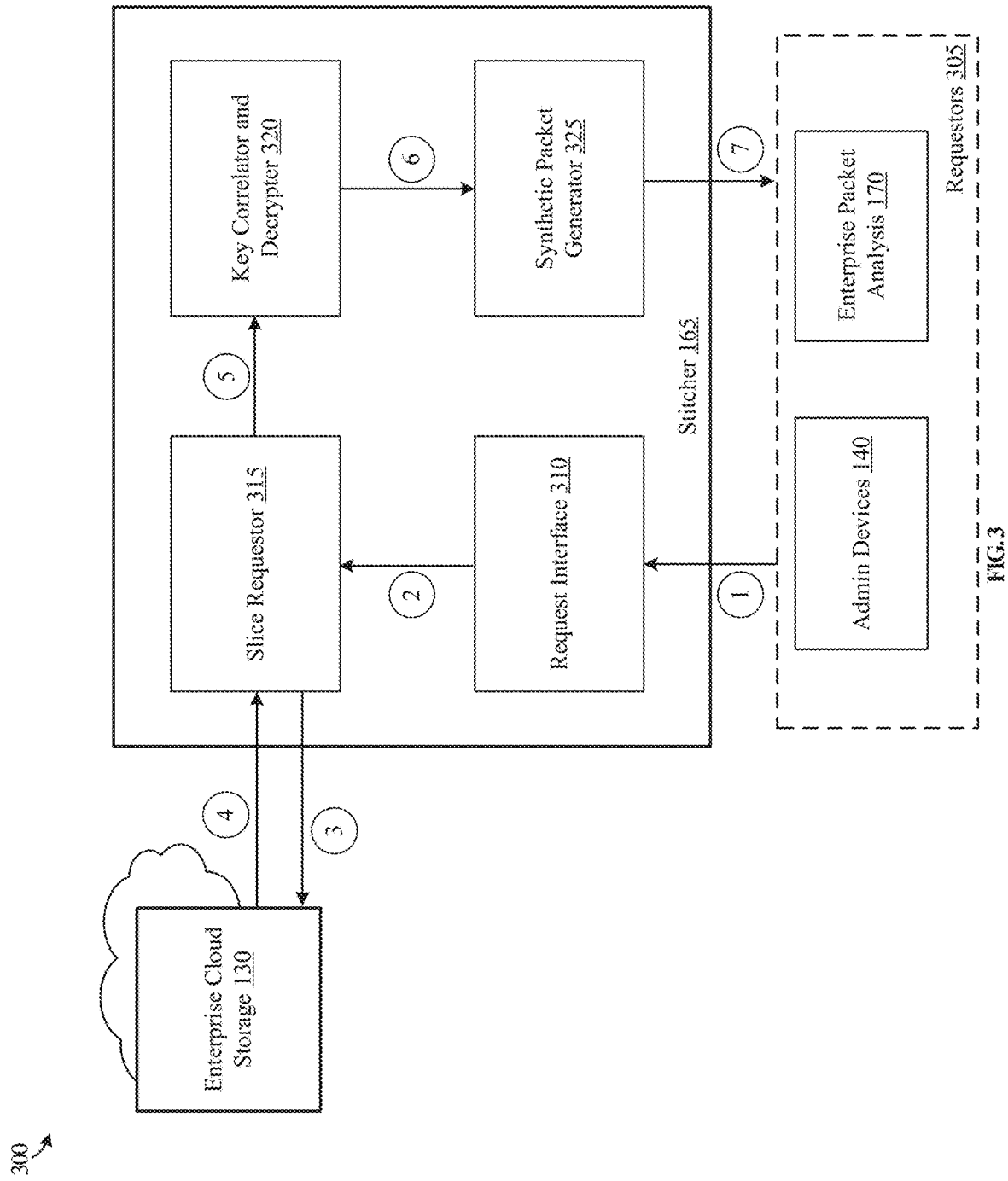
FIG. 3 illustrates details of a stitcher for generating synthetic packet streams of the tapped packets, according to some embodiments.

FIG. 3 illustrates additional process detail 300 specific to stitcher 165 of system 100 of FIG. 1. Detail 300 includes enterprise cloud storage 130, stitcher 165, and requestors 305. Requestors 305 include administrator devices 140 and enterprise packet analysis 170. In some embodiments, a separate stitcher 165 is instantiated for each request. In some cases, one or more of requestors 305 may request continuous packet stream information and one or more of requestors 305 may request packet streams based on certain search parameters. For example, an administrator using administrator device 140 may receive an alert and request relevant traffic information based on the alert. In such examples, stitcher 165 may include a graphical user interface provided via request interface 310 that allows a user to identify parameters for obtaining packet information. The parameters may include selecting communication sessions based on time period, requesting users, intended destinations (e.g., hosted service 120), and the like. In other examples, continuous monitoring systems such as intrusion detection systems, may analyze continuous streams of packets, and therefore a continuous synthetic packet stream of all traffic may be requested by such enterprise packet analysis 170 systems. In either case, requestors 305 submit a request to stitcher 165 via request interface 310 (step 1).

Stitcher 165 includes request interface 310, slice requestor 315, key correlator and decrypter 320, and synthetic packet generator 325. The components shown within stitcher 165 are shown for ease of description and may include more or fewer components to accomplish the described functionality without departing from the spirit of this disclosure. Further, stitcher 165 may perform other functionality in addition to that described here without departing from the spirit of this disclosure.

Request interface 310 may include any hardware, software, and firmware components used to receive requests for packet information including a graphical user interface, application programming interface (API), and the like. Request interface 310 receives the request, determines who or what system made the request, and determines whether the requestor has sufficient credentials that authorize the requestor to receive the response. Based upon determining the request is valid, request interface 310 passes the request to slice requestor 315 (step 2).

Slice requestor 315 may include any hardware, software, and firmware components used to analyze the request, submit a request for relevant data from enterprise cloud storage 130, and receive the resulting data from enterprise cloud storage 130. Slice requestor 315 analyzes the request to determine what to request from enterprise cloud storage 130. For example, if the request is a continuous analysis request, slice requestor 315 may configure a time-based polling for continuously retrieving BLOBs as they are uploaded to enterprise cloud storage 130 by proxy 150 and uploader 155. If the request has parameters associated with it, slice requestor 315 determines which packets to request. In some embodiments, time-based slices of data are obtained that correspond to the relevant request. For example, the uploaded BLOBs have associated upload times, and slice requestor 315 may use this for requesting relevant BLOBs. Slice requestor 315 transmits the relevant request for data to enterprise cloud storage 130 (step 3). Enterprise cloud storage 130 returns the relevant data (step 4).

Upon receipt of the data from enterprise cloud storage 130, slice requestor 315 may extract the packets and session keys from the returned BLOBs. When requestor 305 submitted parameters, slice requestor 315 may filter the packets based on the parameters. In some embodiments, the initiating packets from a communication session are identified to ensure the relevant communication session data is exposed. In other words, to generate a synthetic packet stream for a communication session, the beginning of the communication session is identified and the synthetic packet stream is generated working forward from the beginning because without the instantiation of the communication session, the remainder of the packets in the communication session cannot be properly analyzed and used to generate a synthetic packet stream. Slice requestor 315 passes the extracted and filtered packets and session keys to key correlator and decrypter 320 (step 5).

Key correlator and decrypter 320 may include any hardware, software, and firmware components used to perform the described functionality. Upon receipt of the session keys and packets, key correlator and decrypter 320 may correlate the session keys to the corresponding packets. The session keys may, for example, include an identifier number that may be found in the corresponding packet headers. Key correlator and decrypter 320 may maintain the decryption key to decrypt the session keys if proxy 150 encrypted the session keys. In such cases, key correlator and decrypter 320 may decrypt the session keys. In some embodiments, key correlator and decrypter 320 may use the session keys to decrypt the packets so that the plain text payload of the packets is available. In some embodiments, whether the packets are decrypted may be based on the request by requestors 305 such that sometimes the packets are decrypted and other times the packets are not decrypted. Key correlator and decrypter 320 passes the packets whether decrypted or not to synthetic packet generator 325 (step 6). In some embodiments, key correlator and decrypter 320 may also pass the corresponding session keys to synthetic packet generator 325. In some embodiments, the corresponding session keys may be passed based on whether the request by requestors 305 asked for the session keys.

Synthetic packet generator 325 may generate synthetic packet streams based on the received packets. Synthetic packet generator 325 may modify the header information in the packets to generate the synthetic packet streams. For example, synthetic packet generator 325 may modify the source and/or destination addresses in the level 3 (i.e., L3, or network layer) headers and the source and/or destination ports in the level 4 (i.e., L4, or transport layer) headers. Further each packet may include a sequence number of the packet in the communication session in the L4 headers, and synthetic packet generator 325 may order the packets sequentially for a given communication session using the sequence number, in some embodiments. Note that packets for multiple communication sessions between various endpoints 110 and cloud hosted services 120 may be included in the synthetic packet stream because gateway 145 is receiving packets related to many communication sessions continuously. However, when extracting packets stored in BLOB storage (i.e., enterprise cloud storage 130), stitcher 165 may lose the continuity of the order of the packets, in some embodiments. Accordingly, ordering the packets based on included timestamps, a sequence number of the given communication session, or any other relevant information may help restore the order of the packets in the synthetic packet stream. The synthetic packets have modified headers such that the synthetic packet stream appears as though the bidirectional data flow between the enterprise device (e.g., endpoint 110a) and third parties (e.g., cloud hosted services 120) occurred directly without being intercepted by network security system 125. In some embodiments, the payload of the packets is not modified. Depending on the request by requestors 305, key correlator and decrypter 320 may decrypt the payload such that the plain-text payload of the packets is used to generate the synthetic packets in the synthetic packet stream, in some embodiments. By generating the synthetic packet stream with plain-text payloads, the requestor 305 does not need the session key to analyze the packet stream.

Synthetic packet generator 325 may export the synthetic packet stream and any associated session keys, when included, in a format (e.g., packet capture format) requested by requestors 305. Synthetic packet generator 325 encapsulates the synthetic packet stream for transmission to the requestor 305. Once all steps are complete, synthetic packet generator 325 transmits the synthetic packet stream to the appropriate requestors 305 (step 7).

Figure 4:
FIG. 4 illustrates a method for providing synthetic packet streams of tapped packets, according to some embodiments.

FIG. 4 illustrates method 400 for accessing packets at a packet tap and generating synthetic packet streams using system 100 of FIG. 1. Method 400 may include additional steps not described, and the steps of method 400 may be performed in orders differing from that described here. Method 400 begins at 405 with a gateway intercepting packets of a communication session on the network between a client device and a cloud hosted service. For example, endpoint 110a may send a request to cloud hosted service 120. The request is sent in the form of packets, and endpoint routing client 112a may ensure the packets are steered to gateway 145. Gateway 145 intercepts the packets from endpoint 110a that are destined for cloud hosted service 120 as initial packet that begin a communication session (e.g., a TLS session) of a network connection (e.g., TCP/IP connection), over public network 115.

At 410, an uploader may transmit the packets to a cloud storage location. For example, packet tap 147 may tee off a copy of the packets to uploader 155. Uploader 155 may batch the packets, and send a batch of packets (e.g., in a packet capture format) as a BLOB of data to enterprise cloud storage 130.

At 415, a proxy may derive a session key associated with the communication session. For example, proxy 150 receives the packets from gateway 145. Proxy 150 may derive the session key for the communication session from the TLS handshake associated with the packets.

At 420, the proxy may transmit the session key to the cloud storage location. For example, proxy 150 may batch session keys and send them in batches to enterprise cloud storage 130 as a BLOB of data. In some embodiments, proxy 150 may encrypt the session keys before uploading them to enterprise cloud storage 130.

At 425, a stitcher may obtain the packets and the session key from the cloud storage location. For example, stitcher 165 may request a slice of data from enterprise cloud storage 130 and extract the packets and session keys from the data. As described with respect to FIG. 3, stitcher 165 may request continuous data or particular data based on parameters a requestor provided. For example, stitcher 165 may request a time-based slice of data from enterprise cloud storage 130. As another example, stitcher 165 may periodically poll enterprise cloud storage 130 for new data. In either case, stitcher 165 may extract the session keys and packets from the data, filter the packets to identify the relevant packets and session keys (when parameters are included in a request, for example), correlate the session keys with the packets, decrypt the session keys if proxy 150 encrypted them, and, in some cases, decrypt the packets with the session keys. In cases in which stitcher 165 decrypts the packets with the session keys, the plain text payload of the packets may be used to generate the synthetic packet streams.

At 430, the stitcher may stitch the packets together into a synthetic packet stream of bidirectional data representing at least a portion of the communication session. Continuing the example started at 405, stitcher 165 may modify the destination address in each packet to identify the intended destination of endpoint 110a or cloud hosted service 120 depending on which direction the packet is flowing (i.e., whether endpoint 110a is the source or cloud hosted service 120 is the source). Further, the destination port may be modified in the header to correspond to the associated destination address. Additionally, the packets may be sequentially ordered (e.g., based on a timestamp or a sequence number in the packet header). In this way, the synthetic packet stream represents bidirectional data between endpoint 110a and cloud hosted service 120, and the bidirectional data appears as if the packets were not routed to network security system 125. Note that removing the routing to network security system 125 allows the bidirectional data flow between the respective nodes to be visible to later analysis and auditing systems. If the destination address for each packet was the network address of gateway 145, later analysis and auditing systems would not be able to correlate the packets for the bidirectional data flow for each communication session without specialized modifications to those auditing and analysis systems.

In some embodiments, stitcher 165 may export the synthetic packet stream into a format requested by an analysis or auditing system and transmit the synthetic packet stream to the requesting analysis or auditing system (e.g., administrator device 140, enterprise packet analysis 170). In some embodiments, stitcher 165 may provide the associated session keys with the synthetic packet stream to the requestor. The session key may be transmitted with the synthetic packet stream whether stitcher 165 decrypts the packets or not (i.e., whether or not the plain text payload of the packets is used to generate the synthetic packet stream). Similarly, the session key may not be transmitted with the synthetic packet stream whether stitcher 165 decrypts the packets or not.

Figure 5:
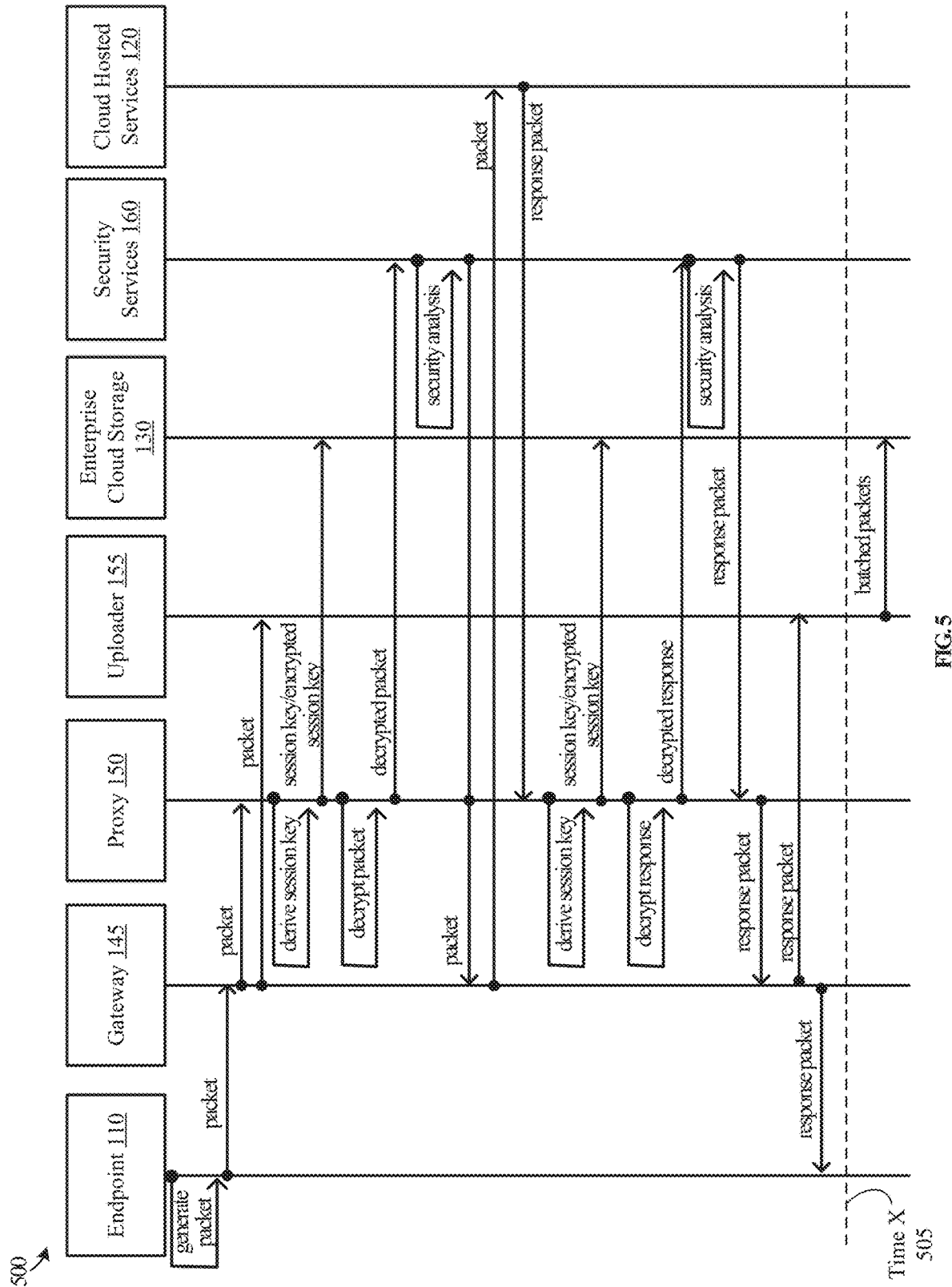
FIG. 5 illustrates an operational scenario of components of FIG. 1, according to some embodiments.

FIG. 5 illustrates an exemplary operational scenario 500 of accessing packets using components of system 100 of FIG. 1. Operational scenario 500 includes endpoint 110, gateway 145, proxy 150, uploader 155, enterprise cloud storage 130, security services 160, and cloud hosted service 120. Operational scenario 500 may be occurring continuously and between any number of endpoints 110 and cloud hosted services 120.

Endpoint 110 generates a packet with an intended destination of cloud hosted service 120, but it is steered to gateway 145 as described herein (e.g., by endpoint routing client 112, an on-premises router or gateway, or the like). Note that endpoint 110 may generate multiple packets for communicating a single request to cloud hosted service 120, but for ease of description, a single packet is described. Gateway 145 intercepts the packet and packet tap 147 in gateway 145 tees off a copy of the packet, sending it to uploader 155. Uploader 155 may batch the packet and at time X 505, send a batch of packets (i.e., all saved packets since the last batch) to enterprise cloud storage 130. In some embodiments, uploader 155 may immediately upload each packet to enterprise cloud storage 130. However, this is inefficient, and transmitting batches of packets as BLOBs may increase efficiency. While Time X 505 indicates that batches are periodically transmitted, in some cases, the batches may be size-based rather than time-based.

Gateway 145 further passes the packet to proxy 150. Proxy 150 derives the session key for the communication session. In some cases, proxy 150 encrypts the session key. In some cases, proxy 150 batches the session key until, for example, time X 505, and at time X 505 proxy 150 may send a batch of session keys to enterprise cloud storage 130. In some cases, rather than time-based batches, size-based batches may be sent. As shown, proxy 150 may immediately upload the session key or encrypted session key to enterprise cloud storage 130. However, immediately uploading is inefficient, and transmitting batches of session keys as BLOBs may increase efficiency. As shown, however, both immediate transmission or batched transmission of both session keys from proxy 150 and packets from uploader 155 may be used, and any combination may be used in system 100. For example, uploader 155 may immediately upload, upload time-based batches, or upload size-based batches, and regardless of the type of uploading uploader 155 uses, proxy 150 may immediately upload, upload time-based batches, or upload size-based batches.

Proxy 150 further may decrypt the packet using the session key and send the decrypted packet to security services 160 for security analysis. In some cases, the packet may be sent to security services 160 without decryption by proxy 150. Security services 160 analyzes the packet using any security techniques. For example, the packet may undergo threat prevention analysis, data loss prevention analysis, and the like. Further, depending on the results of the security analysis, the packet may be blocked from transmission. As shown in operational scenario 500, the packet is sent to proxy 150 and on to gateway 145 for transmission to cloud hosted service 120 (e.g., it passed security analysis). Hosted service 120 generates a response packet and transmits it to proxy 150, which passes the response packet to gateway 145. Note that because gateway 145 intercepted the packet from endpoint 110, the packet transmitted to cloud hosted service 120 was from network security system 125, and cloud hosted service 120 will transmit the response to proxy 150 based on headers and information included in the initial transmitted packet, which network security system 125 may modify to ensure responses are sent to proxy 150.

Proxy 150 receives the response packet from cloud hosted service 120. Proxy 150 derives the session key and uploads a copy of the session key to enterprise cloud storage 130.

Note that, in some embodiments, the communication session between endpoint 110 and hosted service 120 may be technically viewed as two communication sessions because gateway 145 intercepts the packets. Therefore, endpoint 110 has a first communication session with proxy 150 via gateway 145, and hosted service 120 has a second communication session with proxy 150 via gateway 145. However, the combination of the first communication session and the second communication session may be viewed as a single communication session between endpoint 110 and hosted service 120.

As described above, proxy 150 may encrypt the session key. Further, proxy 150 may upload the session key as part of a batch rather than immediately. Proxy 150 may use the session key to decrypt the response packet and send the decrypted packet to security services 160 for analysis. In some embodiments, proxy 150 does not decrypt the packet before sending the packet to security services 160.

Security services 160 may perform security analysis on the response packet. Depending on the results of the security analysis, security services may approve transmission of the response packet to endpoint 110. When approved, security services 160 passes an indication, which may include the response packet, to proxy 150. Proxy 150 transmits the response packet to endpoint 110 via gateway 145. Upon obtaining the response packet from proxy 150, packet tap 147 in gateway 145 tees off a copy of the response packet to uploader 155. Note that this process may begin again with endpoint 110 generating another packet in response to the response from cloud hosted service 120. Regardless of how many packets are sent in the communication session in each direction between endpoint 110 and cloud hosted service 120, a copy of each packet of the bi-directional communication is captured by packet tap 147 in gateway 145 and uploaded by uploader 155 to enterprise cloud storage 130. Further, proxy 150 captures a copy of each session key and uploads it to enterprise cloud storage 130. As a result, a copy of all packets and their associated session keys that flow through gateway 145 and proxy 150 are stored in enterprise cloud storage 130.

Figure 6:
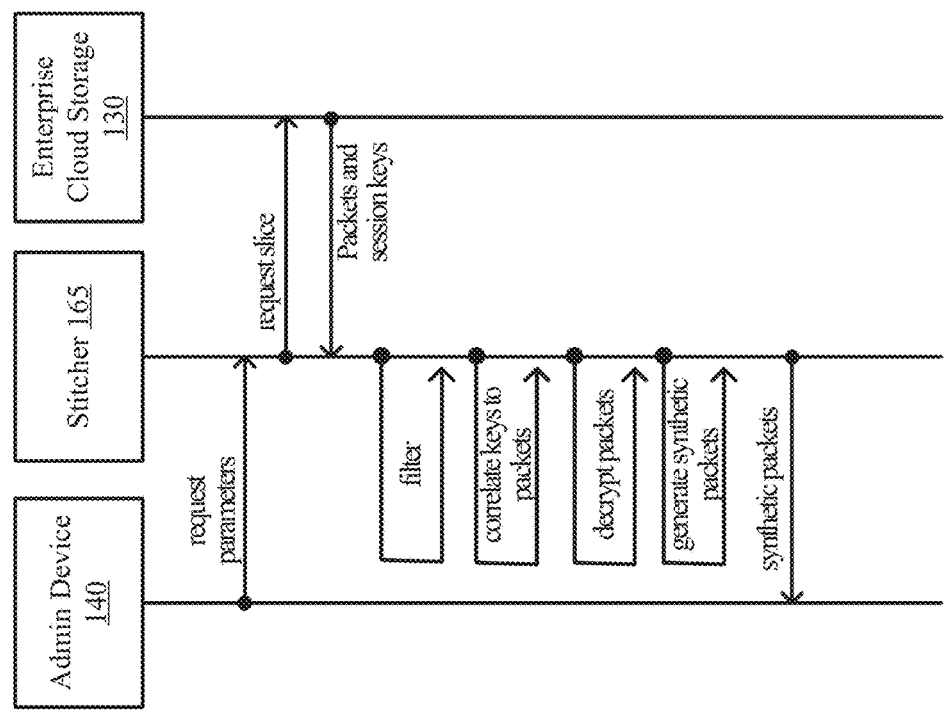
FIG. 6 illustrates another operational scenario of components of FIG. 1, according to some embodiments.

FIG. 6 illustrates an exemplary operational scenario 600 for generating synthetic packet streams using components of system 100 of FIG. 1. As discussed with respect to FIG. 5 and operational scenario 500, a copy of all packets and associated session keys that flow through gateway 145 and proxy 150 are stored in enterprise cloud storage 130. Operational scenario 600 includes administrator device 140, stitcher 165, and enterprise cloud storage 130. A user of administrator device 140 may submit a request to stitcher 165 including request parameters for obtaining communication sessions associated with endpoints 110. For example, the user may have received an alert regarding a particular timeframe, a particular user, a particular endpoint 110, a particular proxy 150, a particular gateway 145, a particular cloud hosted service 120, or the like. The user may use, for example, a graphical user interface for requesting particular information from stitcher 165 (e.g., via request interface 310). Stitcher 165 receives the request, which may include parameters including a timeframe of interest, an endpoint identifier of interest, a user account identifier of interest, a type of packet of interest, a hosted service identifier of interest, a gateway identifier of interest, a proxy identifier of interest, or any other identifiers or values that may be used to filter packets. The request may further indicate a format (e.g., packet capture format) for the resulting synthetic packet stream, whether the packets should be decrypted, and so forth. Stitcher 165 may request a slice of data corresponding to the parameters in the request from enterprise cloud storage 130. For example, a time-based slice of data may be requested. For example, as discussed previously, the naming convention of the BLOBs may allow stitcher 165 to request BLOBs within a given timeframe based on a timestamp in the name of the BLOB. As another example, BLOBs associated with a particular gateway 145 or proxy 150 may be obtained based on the name of the BLOB. Depending on how the data is stored in enterprise cloud storage 130, other search parameters may be used to obtain the data. For example, packets associated with a particular user may be requested if, for example, the packets are stored as structured data. However, when enterprise cloud storage 130 is BLOB storage, time-based slices of data may be the most efficient request method. Other naming convention elements may also provide an efficient request method for relevant BLOBs, in some cases.

In response to the request from stitcher 165, enterprise cloud storage 130 may return the data, which includes packets and session keys. For this example, the request may have been a time-based request, and a slice of data including session key and packet BLOBs are returned. Stitcher 165 may filter the data. Stitcher 165 may extract the packets and session keys from the returned BLOBs in the slice of data. Stitcher 165 may decrypt the session keys if proxy 150 encrypted the session keys before uploading to enterprise cloud storage 130. Stitcher 165 may filter the extracted packets based on the parameters provided in the request. For example, packets associated with a given endpoint 110 may be identified based on the source or destination network address in the packet headers. Types of packets may be identified based on packet headers. Cloud hosted services 120 may be identified based on the source or destination network address in the packet headers. Once packets of interest identifying the initiation of the communication session are identified, other packets within the given communication session may be included to ensure the entire communication session or a relevant portion of the communication session is included in the resulting synthetic packet streams that provide full bi-directional data for the communication sessions.

Stitcher 165 may correlate the session keys with the identified packets. For example, a session key identifier may be found in the packet header and used to correlate the associated session key with the packet. In some embodiments, proxy 150 captures user information with the session keys and includes the user information with the session keys in the BLOBs uploaded to enterprise cloud storage 130. In such embodiments, the user information may be used to filter the packets based on user identifiers of interest, for example. Accordingly, in some embodiments, correlating the session keys to the packets may be done prior to filtering the packets in the slice.

Stitcher 165 may decrypt the filtered packets so that the payload of the packets is plain text. For example, the user request may indicate whether the packets should be decrypted. However, decrypting the packets may be an optional feature such that it is sometimes done and other times not. In some embodiments, stitcher 165 may always decrypt the packets. In some embodiments, stitcher 165 may never decrypt the packets. If decrypted packets are used, the synthetic packets generated include a plain text payload for the packet. To maintain validity of the data, stitcher 165 does not modify the packet payload other than to decrypt the packets. While decryption may be optional, users requesting specific communication sessions for analysis may be provided synthetic packet streams generated from decrypted packets to ensure visibility of the relevant data.

Stitcher 165 uses the filtered packets to generate synthetic packets. To generate the synthetic packets, stitcher 165 modifies the destination address in the level 3 (i.e., L3, or network layer) header of each packet. For example, the destination address may be an IP address of gateway 145 in the packet, and stitcher 165 may modify the destination address to the IP address of hosted service 120 for packets from endpoint 110 intended for hosted service 120, and stitcher 165 may modify the destination address to the IP address of endpoint 110 for packets from hosted service 120 intended for endpoint 110. Stitcher 165 may identify the intended destination (i.e., true destination) of each packet based on information in the respective packet. For example, endpoint routing client 112 may insert the intended destination of the packet into a specific location (e.g., a header entry) in the packet so that network security system 125 can obtain the information for routing the packet to the intended destination. Additionally, network security system 125 may include endpoint address information for the initiating endpoint 110 in the routed packets such that the response may include the endpoint address information in the response, and network security system 125 can associate and route the responses to the relevant endpoint 110. Accordingly, stitcher 165 may use this address information for determining the true destination of each packet and use the address information for the true destination to modify the destination address in the level 3 header. Further, stitcher 165 may modify the destination port in the level 4 (i.e., L4, or transport layer) header of each packet to correspond to the modified destination address.

Further each packet may include a sequence number of the packet in the communication session in the level 4 header. Stitcher 165 may generate a complete, bi-directional synthetic packet stream for at least a portion of a communication session by ordering the packets sequentially for a given communication session. In some embodiments, stitcher 165 may use a timestamp associated with the packet to order the packets sequentially. In some embodiments, packets from multiple communication sessions may be included in the synthetic packets generated by stitcher 165 in response to the request from administrator device 140. The packets from different communication sessions may be separated into separate synthetic packet streams for each communication session, in some embodiments. In some embodiments, all synthetic packets are used and ordered regardless of communication session into a single synthetic packet stream. In some embodiments, the synthetic packets are not ordered into a particular order.

In some embodiments, stitcher 165 exports or formats the synthetic packets into a format requested by the user. Once stitcher 165 completes generating the synthetic packets, stitcher 165 transmits the synthetic packets to administrator device 140 in response to the request. In some embodiments, stitcher 165 transmits the session keys with the synthetic packets to administrator device 140, for example if the session key was requested in the initial request. When complete, administrator device 140 receives the synthetic packets requested, which represent bi-directional data for a communication session between an endpoint and a third party (e.g., cloud hosted service 120). Depending on the request, the synthetic packets may represent bi-directional data from more than one communication session where each communication session is between one of the endpoints 110 and an outside device. While administrator device 140 is shown as the requestor in operational scenario 600, any system in enterprise packet analysis 170 may also submit requests with parameters for obtaining synthetic packet streams in response to the requests.

Figure 7:
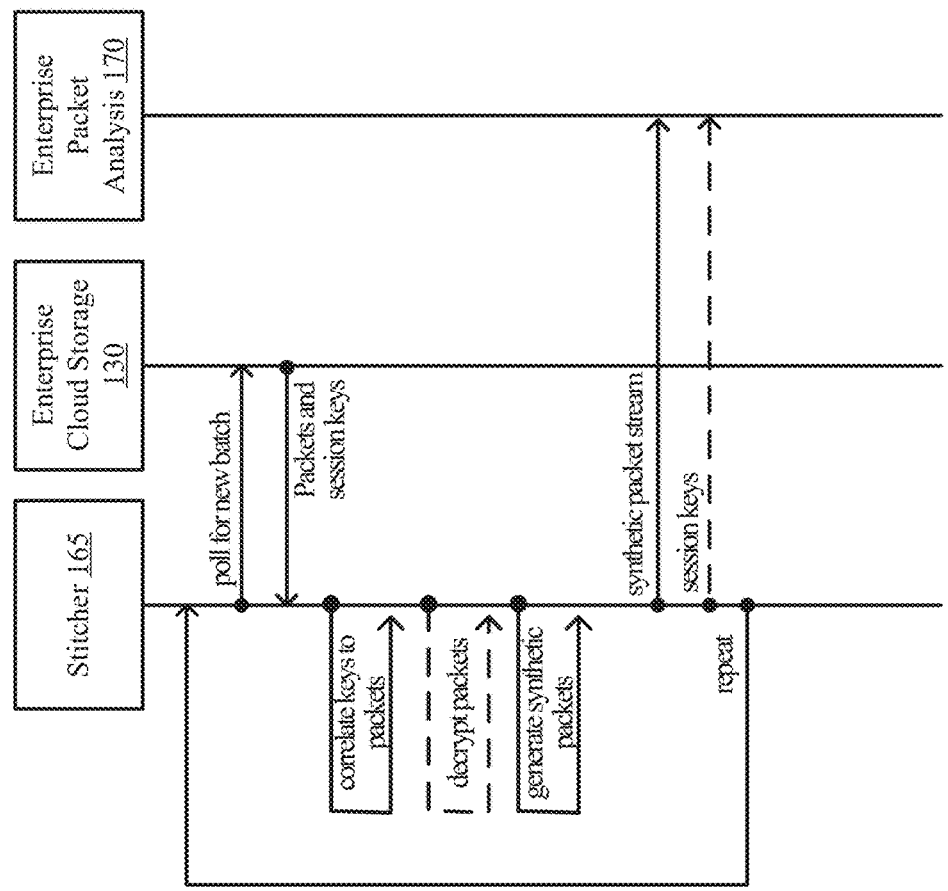
FIG. 7 illustrates another operational scenario of components of FIG. 1, according to some embodiments.

FIG. 7 illustrates operational scenario 700 for continuously generating synthetic packet streams using components of system 100 of FIG. 1. As discussed above, data is continuously uploaded to enterprise cloud storage 130 from proxy 150 and uploader 155. Using the example of BLOB storage, enterprise cloud storage 130 receives BLOBs of packets from uploader 155 and BLOBs of session keys from proxy 150 either on a periodic basis or intermittently based on size. In either case, data is being uploaded often (e.g., many times per day) to enterprise cloud storage 130. Enterprise packet analysis 170 may include a system that performs ongoing analysis, such as an intrusion detection system. An intrusion detection system included in enterprise packet analysis 170 may request a continuous, near real-time stream of the synthetic packets generated by stitcher 165. As such, stitcher 165 may poll enterprise cloud storage 130 for new batches of packets and session keys periodically. For example, if uploader 155 and proxy 150 upload BLOBs to enterprise cloud storage on a periodic basis every ten minutes, stitcher 165 may be configured to poll for newly uploaded BLOBs every five minutes. When one or more new BLOBs (e.g., previously not downloaded for this process) are identified, enterprise cloud storage 130 transmits the batch of packets and/or batch of session keys to stitcher 165.

Upon receipt of the new BLOBs, stitcher 165 may extract the packets and session keys. In some cases, stitcher 165 may decrypt the session keys if proxy 150 encrypted the session keys before uploading to enterprise cloud storage 130. Stitcher 165 may correlate the session keys with the identified packets. For example, a session key identifier may be found in the packet header and used to correlate the associated session key with the packet.

Stitcher 165 may decrypt the packets so that the payload of the packets is plain text. For example, the request from the system in enterprise packet analysis may indicate whether the packets should be decrypted. However, decrypting the packets may be an optional feature such that the packets are sometimes decrypted and other times not based on the request. In some embodiments, stitcher 165 may always decrypt the packets. In some embodiments, stitcher 165 may never decrypt the packets. If decrypted packets are used or requested, the synthetic packets generated by stitcher 165 include the payload of the packet in plain text. Unless requested otherwise, stitcher 165 does not modify the packet payload other than to decrypt the packets.

Stitcher 165 uses the packets to generate a synthetic packet stream. For a request for ongoing traffic, stitcher 165 does not filter the packets. However, in some embodiments, the request for ongoing traffic may include some filtering criteria, which stitcher 165 uses to remove unwanted packets from the packets used to generate the synthetic packet stream. To generate the synthetic packets, stitcher 165 modifies the destination address in the level 3 (i.e., L3, or network layer) header of each packet. For example, the destination address may be an IP address of gateway 145 in the packet, and stitcher 165 may modify the destination address to the IP address of the intended destination (e.g., the IP address of hosted service 120 for packets from endpoint 110 intended for hosted service 120, and the IP address of endpoint 110 for packets from hosted service 120 intended for endpoint 110). Stitcher 165 may identify the intended destination of each packet based on information in the respective packet. For example, endpoint routing client 112 may insert the intended destination (i.e., true destination) of the packet into a specific location (e.g., a header entry) in the packet so that network security system 125 can obtain the information for routing the packet to the intended destination. Additionally, network security system 125 may include endpoint address information for the initiating endpoint 110 in the routed packets so that any response may include the endpoint address information, and network security system 125 can associate and route the responses to the relevant endpoint 110. Accordingly, stitcher 165 may use this address information for determining the true destination of each packet and use the address information for the true destination to modify the destination address in the level 3 header. Further, stitcher 165 may modify the destination port in the level 4 (i.e., L4, or transport layer) header of each packet to correspond to the modified destination address.

Further each packet may include a sequence number of the packet in the communication session in the level 4 header. Stitcher 165 may generate a complete, bi-directional synthetic packet stream for at least a portion of a communication session by ordering the packets sequentially for a given communication session. In some embodiments, stitcher 165 may use a timestamp associated with the packet to order the packets sequentially. In some embodiments, packets from multiple communication sessions may be included in the synthetic packet stream generated by stitcher 165 such that the synthetic packet stream merely represents all packets in the order they flowed through gateway 145. In such embodiments, the synthetic packet stream may represent bi-directional data for a number of communication sessions, where each communication session is between one of the endpoints 110 and a third party (e.g., cloud hosted services 120). In some embodiments, all synthetic packets are used and ordered regardless of communication session into a single synthetic packet stream. In some embodiments, the synthetic packets are not ordered into a particular order. In some embodiments, the packets from different communication sessions may be separated into separate synthetic packet streams for each communication session.

In some embodiments, stitcher 165 encapsulates or formats the synthetic packet stream into a format requested by the user. Once stitcher 165 completes generating the synthetic packet stream, stitcher 165 transmits the synthetic packet stream to the requesting system in enterprise packet analysis 170. In some embodiments, stitcher 165 transmits the session keys with the synthetic packet stream, for example if the session keys were requested with the ongoing request.

When complete, enterprise packet analysis 170 receives the synthetic packet stream, which represents bi-directional data for communication sessions between endpoints 110 in enterprise 105 and third parties (e.g., cloud hosted services 120). Stitcher 165 repeats this polling and processing continuously so that a continuous stream of synthetic packets is transmitted in near real-time to enterprise packet analysis 170 for ongoing analysis.

Note that stitcher 165 may be configured to handle requests in a multi-threaded fashion. For example, stitcher 165 may execute one or more processes to generate synthetic packet streams as illustrated by operational scenario 700 and transmit the generated synthetic packet streams to the relevant requesting systems in enterprise packet analysis 170 and/or execute one or more processes to handle one or more requests as illustrated by operational scenario 600 for responding with synthetic packets to the requesting administrator device 140 or system in enterprise packet analysis 170, and all processes may execute simultaneously.

FIG. 8 illustrates a system 800 depicting the actual tap point for packets as compared to the virtually viewed tap point based on resulting synthetic packets and synthetic packet streams generated by system 100 of FIG. 1. System 800 includes office 805a, office 805b, café 825, public network 115, datacenter 820a, datacenter 820b, and datacenter 820c.

Office 805a may be a first office that has a geographic location and is an office location of enterprise 105. Office 805a may include router 810a, gateway 815a, and endpoint 110a. Endpoint 110a may include endpoint routing client 112a (not shown), that creates client tunnel 835 between endpoint 110a and gateway 145a in datacenter 820a. Client tunnel 835 is a virtual construct for traffic (i.e., packets) flowing from endpoint 110a to gateway 145a. Client tunnel 835 may be a virtual private network (VPN) connection, for example. To physically transmit between endpoint 110a and gateway 145a, the packets travel from endpoint 110a through router 810a through gateway 815a over public network 115 to gateway 145a in datacenter 820a.

Datacenter 820a is a physical location having computing devices that are used logically as cloud-based computing systems. Datacenter 820a may include an instance of gateway 145, depicted as gateway 145a.

Endpoint 110a shows virtual tap point 830, and gateway 145a shows actual tap point 840. While packet tap 147a in gateway 145a is the actual location from which the packets that flow through gateway 145a are tapped for generating synthetic packet streams of communication sessions associated with endpoint 110a, virtual tap point 830 is the perceived tap point for systems receiving the synthetic packet streams (e.g., systems in enterprise packet analysis 170). In other words, the synthetic packet streams generated by stitcher 165 appear as though they are obtained at virtual tap point 830, and any interception by gateway 145a does not appear within the synthetic packet streams. As such, analysis and auditing systems can view and analyze the bidirectional data for communication sessions between endpoint 110a and third parties (e.g., cloud hosted services 120) without the noise introduced by the interception and security analysis of network security system 125. In other words, removing the interception of the packets by network security system 125 from the packet stream allows the analysis and auditing systems (e.g., enterprise packet analysis 170) to properly analyze and audit the traffic.

Office 805b may be a second office that is in another geographic location and is another office location of enterprise 105. Office 805b may include router 810b, gateway 815b, endpoint 110b, and endpoint 110c. Endpoints 110b and 110c may be configured to pass all data through router 810b and gateway 815b. Gateway 815b may include a routing client (e.g., endpoint routing client 112) (not shown), that routes all traffic from endpoint 110b and endpoint 110c to gateway 145b. An IPSec tunnel 850 is created between gateway 815b and gateway 145b in datacenter 820b. IPSec tunnel 850 is a virtual construct for traffic (i.e., packets) flowing from gateway 815b to gateway 145b. IPSec tunnel 850 may be a virtual private network (VPN) connection, for example. To physically transmit between gateway 815b and gateway 145b, the packets travel from endpoints 110b and 110c through router 810b through gateway 815b over public network 115 to gateway 145b in datacenter 820b.

Datacenter 820b is another physical location having computing devices that are used logically as cloud-based computing systems. Datacenter 820b may include an instance of gateway 145, depicted as gateway 145b.

Gateway 815b shows virtual tap point 845, and gateway 145b shows actual tap point 855. While packet tap 147b in gateway 145b is the actual location from which the packets that flow through gateway 145b are tapped for generating synthetic packet streams of communication sessions associated with endpoints 110b and 110c, virtual tap point 845 is the perceived tap point for systems receiving the synthetic packet streams (e.g., systems in enterprise packet analysis 170). In other words, the synthetic packet streams generated by stitcher 165 appear as though they are obtained at virtual tap point 845, and any interception by gateway 145b does not appear within the synthetic packet streams. As such, analysis and auditing systems can view and analyze the bidirectional data for communication sessions between endpoints 110b and 110c and third parties (e.g., cloud hosted services 120) without the noise introduced by the interception and security analysis of network security system 125. In other words, removing the interception of the packets by network security system 125 from the packet stream allows the analysis and auditing systems (e.g., enterprise packet analysis 170) to properly analyze and audit the traffic.

Café 825 may be any location external to enterprise 105 that may include a router 810c for accessing public network 115. Endpoint 110d may include endpoint routing client 112d (not shown), that creates client tunnel 865 between endpoint 110d and gateway 145c in datacenter 820c. Client tunnel 865 is a virtual construct for traffic (i.e., packets) flowing from endpoint 110d to gateway 145c. Client tunnel 865 may be a virtual private network (VPN) connection, for example. To physically transmit between endpoint 110d and gateway 145c, the packets travel from endpoint 110d through router 810c over public network 115 to gateway 145c in datacenter 820c.

Datacenter 820c is a physical location having computing devices that are used logically as cloud-based computing systems. Datacenter 820c may include an instance of gateway 145, depicted as gateway 145c.

Endpoint 110d shows virtual tap point 860, and gateway 145c shows actual tap point 870. While packet tap 147c in gateway 145c is the actual location from which the packets that flow through gateway 145c are tapped for generating synthetic packet streams of communication sessions associated with endpoint 110d, virtual tap point 860 is the perceived tap point for systems receiving the synthetic packet streams (e.g., systems in enterprise packet analysis 170). In other words, the synthetic packet streams generated by stitcher 165 appear as though they are obtained at virtual tap point 860, and any interception by gateway 145c does not appear within the synthetic packet streams. As such, analysis and auditing systems can view and analyze the bidirectional data for communication sessions between endpoint 110d and third parties (e.g., cloud hosted services 120) without the noise introduced by the interception and security analysis of network security system 125. In other words, removing the interception of the packets by network security system 125 from the packet stream allows the analysis and auditing systems (e.g., enterprise packet analysis 170) to properly analyze and audit the traffic.

Figure 9:
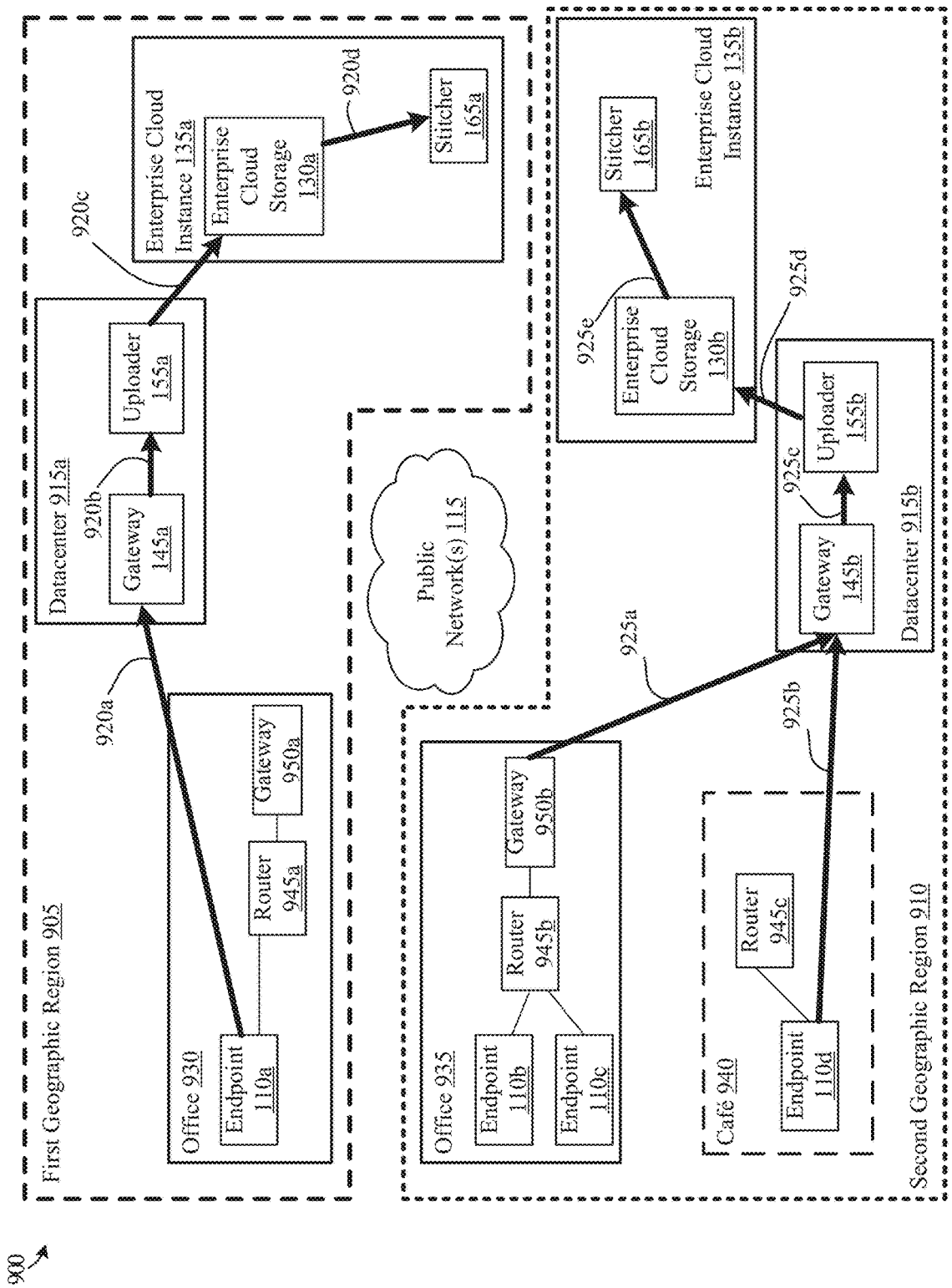
FIG. 9 illustrates geo-optimized data flows for packet taps and corresponding synthetic packet streams, according to some embodiments.

FIG. 9 illustrates geo-optimized system 900, which is an instance of a system including components of system 100. In system 900, first geographic region 905 includes office 930, datacenter 915a, and enterprise cloud instance 135a. Second geographic region 910 includes office 935, café 940, datacenter 915b, and enterprise cloud instance 135b. First geographic region 905 and second geographic region 910 are distinct geographic areas. For example, first geographic region 905 may be in the United States, and second geographic region 910 may be in Europe.

Office 930 includes endpoint 110a, router 945a, and gateway 950a. Office 930 may be substantially the same as office 805a described with respect to FIG. 8. Enterprise 105 may utilize a network security system 125 having a gateway 145a and uploader 155a in datacenter 915a as well as a gateway 145b and uploader 155b in datacenter 915b. Accordingly, traffic from endpoint 110a in first geographic region 905 may be routed through gateway 145a (shown as arrow 920a), and traffic from endpoints 110b, 110c, and 110d may be routed through gateway 145b (shown as arrows 925a and 925b). Further, enterprise 105 may have enterprise cloud instance 135a in first geographic region 905 as well as enterprise cloud instance 135b in second geographic region 910. To geo-optimize system 900, components hosted in datacenters that are geographically closest together are used together. Enterprise cloud instances 135a and 135b may be in the respective geographic regions as indicated by the cloud provider, which is specified when the cloud instance is obtained/initiated by the enterprise with the cloud provider. In other words, when an enterprise initiates an enterprise cloud instance 135, the geographic region is specified and managed by the cloud provider, which typically ensures that datacenters used for hosting components, storage, and the like for a given enterprise cloud instance 135 are geographically close. To geo-optimize the first geographic region 905, packet tap 147a in gateway 145a transmits copies of packets to uploader 155a in datacenter 915a (shown with arrow 920b), and uploader 155a uploads to enterprise cloud storage 130a in enterprise cloud instance 135a in first geographic region 905 (shown as arrow 920c). Additionally, packet tap 147b in gateway 145b transmits copies of packets to uploader 155b in datacenter 915b (shown with arrow 925c), and uploader 155b uploads to enterprise cloud storage 130b in enterprise cloud instance 135b in second geographic region 910 (shown as arrow 925d).

Enterprise 105 may have a copy of stitcher 165a in enterprise cloud instance 135a and a copy of stitcher 165b in enterprise cloud instance 135b. Accordingly, to further geo-optimize system 900, stitcher 165a pulls data from enterprise cloud storage 130a (shown as arrow 920d), and stitcher 165b pulls data from enterprise cloud storage 130b (shown as arrow 925e). If needed, stitcher 165a may pull data from enterprise cloud storage 130b, and stitcher 165b may pull data from enterprise cloud storage 130a, but such situations may be rare.

Figure 10:
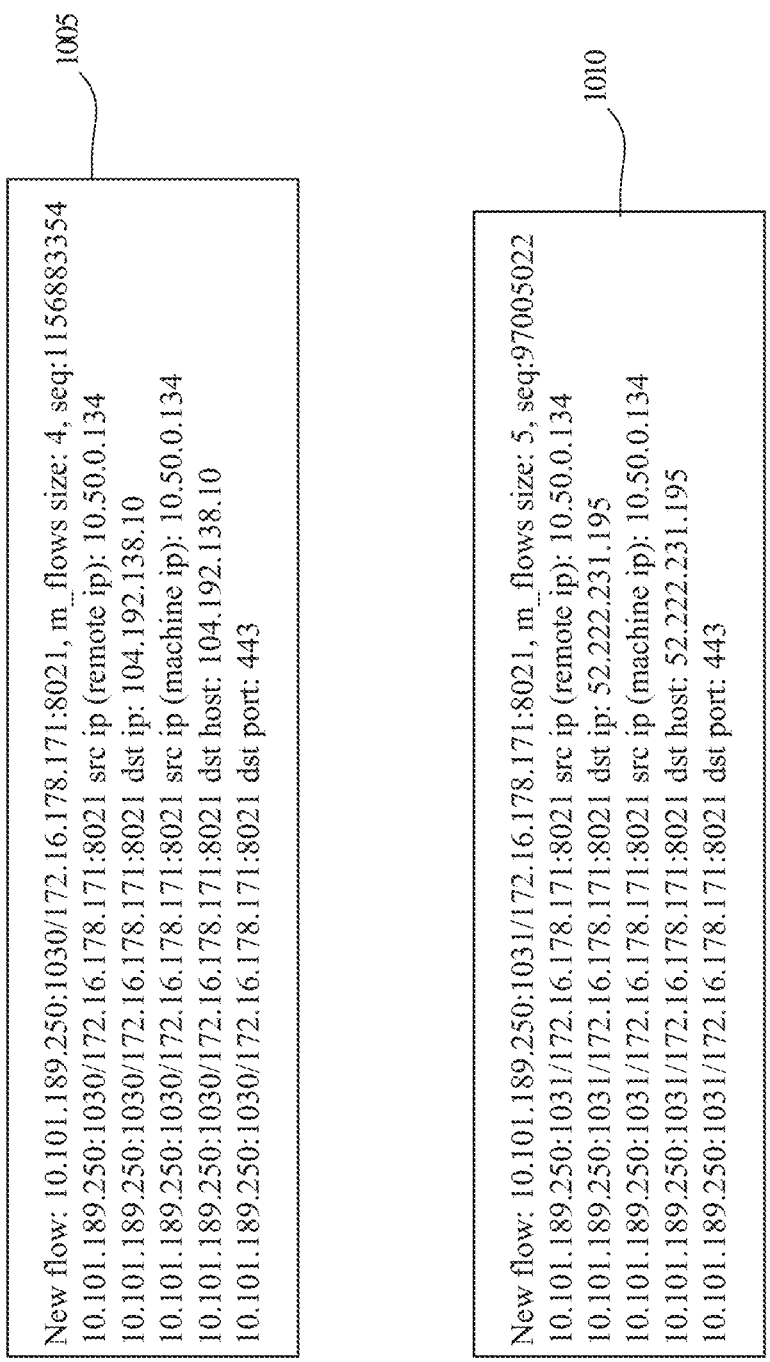
FIG. 10 illustrates exemplary packet transformations for generating a synthetic packet stream, according to some embodiments.

FIG. 10 illustrates exemplary transformations 1000 for communication sessions. Transformations 1000 includes exemplary header transformation data captured or generated by gateway 145 and used by stitcher 165 to generate synthetic packet streams based on packets transmitted in the associated communication sessions. The transformation information is transmitted "in line" from gateway 145 to proxy 150 before the application data in the captured packets, so stitcher 165 receives the transformation data and uses it to generate the synthetic packet stream. Each source (e.g., endpoint 110) has a source network address and a source port for the communication session, and each destination (e.g., cloud hosted service 120) has a destination network address and a destination port for the communication session. The combination of source network address (e.g., IP address), source port, destination network address (e.g., IP address), and destination port form a 4-tuple. The original 4-tuple for the communication session is the source network address and source port for the endpoint 110 and the destination network address and destination port for the cloud hosted service 120. However, gateway 145 generates a source network address for the endpoint that is used within network security system 125 and the destination network address is the network address for proxy 150. Accordingly, the packets include header information that is not representative of the source and destination outside of network security system 125.

As a first example, transformation 1005 is the transformation information captured for a communication session between a client device with a network address of "10.50.0.134" indicated as the "src ip" on the second line of transformation 1005 and a hosted service with a network address of "104.192.138.10" indicated as "dst ip" on the third line of transformation 1005. The captured destination port is "443," indicated as "dst port" on the last line of transformation 1005. The source port is maintained from the endpoint, which is "1030." Accordingly, the true 4-tuple for the communication session is "10.50.0.134:1030/104.192.138.10:443." However, network security system 125 captures packets having header information indicating the 4-tuple "10.101.189.250:1030/172.16.178.171:8021." In this example, "10.101.189.250" is a network address for the endpoint generated by gateway 145. Further, "172.16.178.171" is the network address for proxy 150, and "8021" is the port for proxy 150. Transformation 1005 is used by stitcher 165 to generate synthetic packets. Stitcher 165 modifies the source network address in the headers of packets transmitted from endpoint 110 to cloud hosted service 120 from "10.101.189.250" to "10.50.0.134." In this example, the source port does not need to be modified. Further, stitcher 165 modifies the destination network address in the headers from 172.16.178.171" to 104.192.138.10." Finally, stitcher 165 modifies the destination port in the headers from "8021" to "443." For packets transmitted from cloud hosted service 120 to endpoint 110, the source network address is changed to "104.192.138.10," the source port is changed to "443," the destination network address is changed to "10.50.0.134," and the destination port is changed to "1030" as needed.

As a second example, transformation 1010 is the transformation information captured for a communication session between a client device with a network address of "10.50.0.134" indicated as the "src ip" and a hosted service with a network address of "52.222.231.195" indicated as "dst ip." The captured destination port is "443," indicated as "dst port." The source port is maintained from the original endpoint information, which is "1031" in this example. Accordingly, the true 4-tuple for the communication session is "10.50.0.134:1031/52.222.231.195:443." However, network security system 125 captures packets having header information indicating the 4-tuple "10.101.189.250:1031/ 172.16.178.171:8021." In this example, "10.101.189.250" is the network address for the endpoint generated by gateway 145. Further, "172.16.178.171" is the network address for proxy 150, and "8021" is the port for proxy 150. Transformation 1010 is used by stitcher 165 to generate synthetic packets for this communication session. Stitcher 165 modifies the source network address in the headers of packets transmitted from endpoint 110 to cloud hosted service 120 from "10.101.189.250" to "10.50.0.134" just as in transformation 1005, in this case. Similarly, in this example, the source port does not need to be modified. Further, stitcher 165 modifies the destination network address in the headers from 172.16.178.171" to "52.222.231.195." Finally, stitcher 165 modifies the destination port in the headers from "8021" to "443." For packets transmitted from cloud hosted service 120 to endpoint 110, the source network address is changed to "52.222.231.195," the source port is changed to "443," the destination network address is changed to 10.50.0.134," and the destination port is changed to "1031" if needed.

Figure 11:
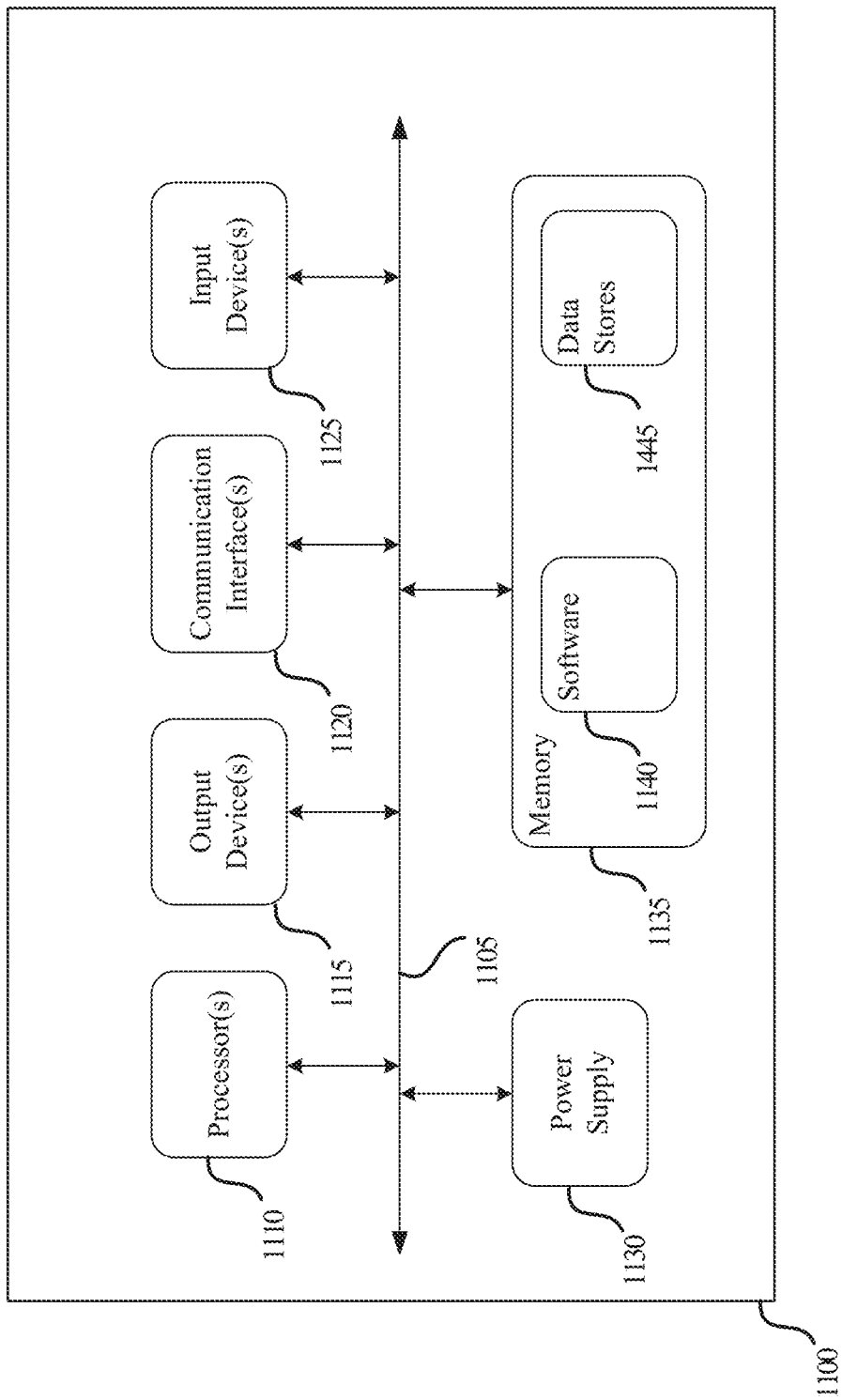
FIG. 11 illustrates an exemplary computing system, according to some embodiments.

FIG. 11 illustrates a computing device 1100. The computing device 1100 includes various components not included for ease of description in other computing devices discussed herein including, for example, endpoints 110 and admin devices 140 or computing devices hosting network security system 125, enterprise cloud storage 130, enterprise cloud instance 135, or cloud hosted services 120. Accordingly, computing device 1100 may be endpoints 110 and admin devices 140 or computing devices hosting network security system 125, enterprise cloud storage 130, enterprise cloud instance 135, or hosted services 120 by incorporating the functionality described in each.

Computing device 1100 is suitable for implementing processing operations described herein related to cybersecurity enforcement, packet tap, and synthetic packet stream generation based on the packet tap, with which aspects of the present disclosure may be practiced. Computing device 1100 may be configured to implement processing operations of any component described herein including the user system components (e.g., endpoints 110 and administrator device 140 of FIG. 1). As such, computing device 1100 may be configured as a specific purpose computing device that executes specific processing operations to solve the technical problems described herein including those pertaining to security enforcement, accessing packets with a packet tap, and synthetic packet stream generation. Computing device 1100 may be implemented as a single apparatus, system, or device or may be implemented in a distributed manner as multiple apparatuses, systems, or devices. For example, computing device 1100 may comprise one or more computing devices that execute processing for applications and/or services over a distributed network to enable execution of processing operations described herein over one or more applications or services. Computing device 1100 may comprise a collection of devices executing processing for front-end applications/services, back-end applications/services, or a combination thereof. Computing device 1100 includes, but is not limited to, a bus 1105 communicably coupling processors 1110, output devices 1115, communication interfaces 1120, input devices 1125, power supply 1130, and memory 1135. Non-limiting examples of computing device 1100 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 1110 may include general processors, specialized processors such as graphical processing units (GPUs) and digital signal processors (DSPs), or a combination. Processors 1110 may load and execute software 1140 from memory 1135. Software 1140 may include one or more software components such as endpoint routing client 112, stitcher 165, enterprise packet analysis 170, uploader 155, gateway 145, packet tap 147, proxy 150, security services 160, slice requestor 315, request interface 310, key correlator and decrypter 320, synthetic packet generator 325, or any combination including other software components. In some examples, computing device 1100 may be connected to other computing devices (e.g., display device, audio devices, servers, mobile/remote devices, VR devices, AR devices, etc.) to further enable processing operations to be executed. When executed by processors 1110, software 1140 directs processors 1110 to operate as described herein for at least the various processes, operational scenarios, and sequences discussed in the foregoing implementations. Computing device 1100 may optionally include additional devices, features, or functionality not discussed for purposes of brevity. For example, software 1140 may include an operating system that is executed on computing device 1100. Computing device 1100 may further be utilized as endpoints 110 or any of the cloud computing systems in system 100 (FIG. 1) including network security system 125 or may execute the method 400 of FIG. 4, or any combination.

Referring still to FIG. 11, processors 1110 may include a processor or microprocessor and other circuitry that retrieves and executes software 1140 from memory 1135. Processors 1110 may be implemented within a single processing device but may also be distributed across multiple processing devices or sub-systems that cooperate in executing program instructions. Examples of processors 1110 include general purpose central processing units, microprocessors, graphical processing units, application specific processors, sound cards, speakers and logic devices, gaming devices, VR devices, AR devices as well as any other type of processing devices, combinations, or variations thereof.

Memory 1135 may include any computer-readable storage device readable by processors 1110 and capable of storing software 1140 and data stores 1145. Data stores 1145 may include enterprise cloud storage 130, for example. Memory 1135 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 1135 may also include computer-readable communication media over which at least some of software 1140 may be communicated internally or externally. Memory 1135 may be implemented as a single storage device but may also be implemented across multiple storage devices or sub-systems co-located or distributed relative to each other. Memory 1135 may include additional elements, such as a controller, capable of communicating with processors 1110 or possibly other systems.

Software 1140 may be implemented in program instructions and among other functions may, when executed by processors 1110, direct processors 1110 to operate as described with respect to the various operational scenarios, sequences, and processes illustrated herein. For example, software 1140 may include program instructions for executing a packet tap, synthetic packet stream generation, security policy enforcement, or the like as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1140 may include additional processes, programs, or components, such as operating system software, virtual machine software, or other application software. Software 1140 may also include firmware or some other form of machine-readable processing instructions executable by processors 1110.

In general, software 1140 may, when loaded into processors 1110 and executed, transform a suitable apparatus, system, or device (of which computing device 1100 is representative) overall from a general-purpose computing system into a special-purpose computing system customized to execute specific processing components described herein as well as process data and respond to queries. Indeed, encoding software 1140 on memory 1135 may transform the physical structure of memory 1135. The specific transformation of the physical structure may depend on various factors in different implementations of this description. Examples of such factors may include, but are not limited to, the technology used to implement the storage media of memory 1135 and whether the computer-storage media are characterized as primary or secondary storage, as well as other factors.

For example, if the computer readable storage device is implemented as semiconductor-based memory, software 1140 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 1120 may include communication connections and devices that allow for communication with other computing systems (not shown) over communication networks (not shown in FIG. 11), for example public network 115. Communication interfaces 1120 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 1120 may also include associated user interface software executable by processors 1110 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on endpoint 110 or administrator device 140. Exemplary applications/services may further be configured to interface with processing components of computing device 1100 that enable output of other types of signals (e.g., audio output, handwritten input) in conjunction with operation of exemplary applications/services (e.g., a collaborative communication application/service, electronic meeting application/service, etc.) described herein.

Input devices 1125 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 1115 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 1100 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 1100 has a power supply 1130, which may be implemented as one or more batteries. The power supply 1130 may further include an external power source, such as an AC adapter or a powered docking cradle that supplements or recharges the batteries. In some embodiments, the power supply 1130 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A system, comprising:
   a gateway, interposed on a network between a client device associated with a first network address and a cloud hosted service associated with a second network address, wherein the gateway is configured to:
      intercept packets of a communication session on the network between the client device and the cloud hosted service,
      transmit the packets to an uploader, and
      transmit the packets to a proxy;
   the uploader configured to:
      transmit the packets to a cloud storage location;
   the proxy configured to:
      derive a session key associated with the communication session, and
      transmit the session key to the cloud storage location; and
   a stitcher configured to:
      obtain the packets and the session key from the cloud storage location,
      correlate the packets of the communication session with the session key,
      decrypt the packets using the session key to produce plain-text payloads of the packets, and
      generate a synthetic packet stream of bidirectional data representing at least a portion of the communication session between the client device and the cloud hosted service based on the packets and using the plain-text payloads of the packets, wherein to generate the synthetic packet stream comprises:
         ordering the packets into a sequential order; and
         modifying at least one of a destination network address and a source network address in each packet to one of the first network address and the second network address based on an intended destination and a source of the respective packet.

2. The system of claim 1, wherein the proxy is further configured to:
   encrypt the session key, wherein the transmit the session key transmits the encrypted session key.

3. The system of claim 1, wherein the stitcher is further configured to:
   modify level 3 headers, level 4 headers, or both in the packets to generate the synthetic packet stream.

4. The system of claim 1, further comprising:
   a plurality of gateways, wherein:
      each gateway of the plurality of gateways has a distinct geographic location;
   a plurality of uploaders, wherein:
      the uploader is co-located with the gateway, and
      the cloud storage location is geo-optimized with the uploader; and
   a plurality of stitchers, wherein:
      the cloud storage location is geo-optimized with the stitcher.

5. The system of claim 1, wherein the stitcher is further configured to:
   export the synthetic packet stream to a requested format.

6. The system of claim 1, wherein the stitcher is further configured to:
   transmit the synthetic packet stream to an enterprise packet analysis system.

7. The system of claim 6, wherein the stitcher is further configured to:
   transmit the session key to the enterprise packet analysis system with the synthetic packet stream.

8. The system of claim 1, wherein the stitcher is further configured to:
   receive a request for the communication session, wherein the request comprises one or more filtering parameters;
   access a time-based slice of data from the cloud storage location in response to the request, wherein the time-based slice of data comprises the packets;
   filter the packets in the time-based slice based on the one or more filtering parameters; and
   generate the synthetic packet stream using the filtered packets.

9. The system of claim 1, wherein the uploader is further configured to:
- batch the packets as they are transmitted from the gateway; and
- transmit the packets to the cloud storage location in batches.

10. The system of claim 1, wherein the stitcher is further configured to:
- periodically poll the cloud storage location for new packets;
- obtain the new packets; and
- continuously generate synthetic packet streams using the new packets.

11. A computer-implemented method, comprising:
- intercepting, at a gateway of a network security system interposed on a network between a client device associated with a first network address and a cloud hosted service associated with a second network address, packets of a communication session on the network between the client device and the cloud hosted service;
- transmitting, by an uploader of the network security system, the packets to a cloud storage location;
- deriving, by a proxy of the network security system, a session key associated with the communication session from the packets;
- transmitting, by the proxy, the session key to the cloud storage location;
- obtaining, by a stitcher, the packets and the session key from the cloud storage location;
- correlating, by the stitcher, the packets of the communication session with the session key;
- decrypting, by the stitcher, the packets using the session key to produce plain-text payloads of the packets; and
- stitching, by the stitcher, the packets together into a synthetic packet stream of bidirectional data representing at least a portion of the communication session using the plain-text payloads of the packets, wherein the stitching the packets together comprises:
  - ordering the packets into a sequential order; and
  - modifying at least one of a destination address and a source address in each packet to one of the first network address and the second network address based on an intended destination and a source of the respective packet.

12. The method of claim 11, further comprising:
encrypting, by the proxy, the session key, wherein transmitting the session key transmits the encrypted session key.

13. The method of claim 11, wherein the stitching the packets together further comprises modifying level 3 headers, level 4 headers, or both in the packets to generate the synthetic packet stream.

14. The method of claim 11, wherein:
- the gateway is a first gateway of a plurality of gateways;
- each gateway of the plurality of gateways has a distinct geographic location;
- the uploader is a first uploader of a plurality of uploaders;
- the first uploader is co-located with the first gateway;
- the cloud storage location is geo-optimized with the first uploader;
- the stitcher is a first stitcher of a plurality of stitchers; and
- the first stitcher is geo-optimized with the cloud storage location.

15. The method of claim 11, further comprising:
exporting, by the stitcher, the synthetic packet stream to a requested format.

16. The method of claim 11, further comprising:
transmitting, by the stitcher, the synthetic packet stream to a packet analysis system.

17. The method of claim 16, further comprising:
transmitting, by the stitcher, the session key to the packet analysis system with the synthetic packet stream.

18. The method of claim 11, further comprising:
- receiving, by the stitcher, a request for the communication session, wherein the request includes one or more filtering parameters;
- accessing, by the stitcher, a time-based slice of data from the cloud storage location based on the request, wherein the time-based slice of data comprises the packets;
- filtering, by the stitcher, the packets in the time-based slice based on the one or more filtering parameters; and
- generating, by the stitcher, the synthetic packet stream using the filtered packets.

19. The method of claim 11, further comprising:
- batching, by the uploader, the packets as they are intercepted by the gateway; and
- transmitting, by the uploader the packets to the cloud storage location in batches.

20. The method of claim 11, further comprising;
- periodically polling, by the stitcher, the cloud storage location for new packets;
- obtaining, by the stitcher, the new packets; and
- continuously generating, by the stitcher, synthetic packet streams using the new packets.

* * * * *